(12) United States Patent
Takaku

(10) Patent No.: US 7,426,876 B2
(45) Date of Patent: Sep. 23, 2008

(54) MACHINE TOOL

(75) Inventor: Masakazu Takaku, Tsuchiura (JP)

(73) Assignee: Tokyo Seimitsu Co., Ltd., Tokyo (JP)

( * ) Notice: Subject to any disclaimer, the term of this patent is extended or adjusted under 35 U.S.C. 154(b) by 133 days.

(21) Appl. No.: 11/406,870

(22) Filed: Apr. 18, 2006

(65) Prior Publication Data
US 2006/0261969 A1 Nov. 23, 2006

(30) Foreign Application Priority Data
May 17, 2005 (JP) ............... 2005-144244

(51) Int. Cl.
B25B 23/14 (2006.01)
G01L 5/24 (2006.01)
(52) U.S. Cl. .................................. 73/862.21
(58) Field of Classification Search ............... 73/862.21
See application file for complete search history.

(56) References Cited

U.S. PATENT DOCUMENTS

| 2,945,401 | A | * | 7/1960 | Howey et al. | ............... | 173/190 |
| 3,040,607 | A | * | 6/1962 | Bulliet | ........................ | 82/11.1 |
| 3,458,881 | A | * | 8/1969 | Drechsler et al. | ........... | 470/167 |
| 3,461,353 | A | * | 8/1969 | Thorson | ...................... | 361/180 |
| 4,440,530 | A | * | 4/1984 | Yamakage | ..................... | 408/3 |
| 4,806,848 | A | | 2/1989 | Demers | | |
| 5,351,039 | A | * | 9/1994 | Oketani et al. | .............. | 340/680 |
| 6,973,738 | B2 | * | 12/2005 | Kaneda et al. | ................. | 33/636 |

FOREIGN PATENT DOCUMENTS

| DE | 201 15 280 U 1 | 2/2002 |
| JP | 2002-200542 | 7/2002 |
| JP | 2003-334742 | 11/2003 |
| JP | 2004-42208 | 2/2004 |
| JP | 2004-276145 | 10/2004 |

OTHER PUBLICATIONS

European Search Report dated Aug. 22, 2006, for 06113665.1, in the name of Tokyo Seimitsu Co., Ltd., et al.
English translation of DE 201 15 280 U 1 listed above.

(Continued)

Primary Examiner—Edward Lefkowitz
Assistant Examiner—Octavia Davis
(74) Attorney, Agent, or Firm—Christie, Parker & Hale, LLP

(57) ABSTRACT

A machine tool in which a tool holder having a tool is attached to a main spindle and the main spindle is rotated to conduct machining on a workpiece, comprises: a displacement sensor, the impedance of which is changed according to a distance from the displacement sensor to the tool holder, an AC signal being impressed upon the displacement sensor from an amplifying unit, wherein an abnormality of a state, in which the tool holder is attached to the main spindle, is judged from a signal level appearing in the displacement sensor. The machine tool further comprises: a tuning circuit connected to the displacement sensor, the tuning circuit composing a resonance circuit together with the displacement sensor; and an impedance adjustment circuit for adjusting an internal impedance constant of the tuning circuit.

20 Claims, 15 Drawing Sheets

OTHER PUBLICATIONS

Patent Abstract of Japan, Publication No. 2002200542 A, Published on Jul. 16, 2002, in the name of Takaku.

Patent Abstract of Japan, Publication No. 2003334742 A, Published on Nov. 25, 2003, in the name of Takaku.

Patent Abstract of Japan, Publication No. 2004042208 A, Published on Feb. 12, 2004, in the name of Takaku.

Patent Abstract of Japan, Publication No. 2004276145 A, Published on Oct. 7, 2004, in the name of Takaku et al.

* cited by examiner

MACHINE TOOL

CROSS-REFERENCE TO RELATED APPLICATION

This application claims priority of Japanese Patent Application Number 2005-144244, filed on May 17, 2005.

BACKGROUND OF THE INVENTION

1. Field of the Invention

The present invention relates to a technique for adjusting a measurement device for measuring a distance to a tool holder in order to judge an abnormality of a state in which the tool holder is attached to a machine tool having a rotary shaft. More particularly, the present invention relates to a machine tool having a sensor which can be easily replaced when the above measurement device is automatically adjusted in a machine tool in which a tool holder such as a machining center, which will be referred to as an "MC" hereinafter, is used.

2. Description of the Related Art

An MC is a device in which various tools are automatically selected according to a machining process and the thus selected tool is automatically attached to a main spindle so as to conduct various types of machining. In this MC, tools are replaced by an automatic tool changing device (ATC). Using this ATC device, a tool holder, to which a tool is attached, is automatically taken out from a tool magazine and automatically attached to a main spindle.

FIG. 1 is a sectional view showing a state in which a tool holder 3 is attached to a main spindle 4. As shown in the drawing, the tool holder 3 has a conical engaging portion 3a, and this engaging portion 3a is engaged with a conical portion 4a to be engaged which is formed in the main spindle 4.

This procedure is described as follows. When a shaft rod 90 is pulled to the right, a ball holding body 91 and balls 92 are moved according to the movement of the shaft rod 90. When the balls 92 are moved, a pull stud (drawing bolt) 93 is pulled, and the conical engaging portion 3a of the tool holder 3 is pressed to the conical portion 4a, to be engaged, of the main spindle 4. Due to this pressing force, the engaging portion 3a is tightly contacted with the portion 4a to be engaged, and chucking is conducted.

FIGS. 2A and 2B are schematic illustrations showing a state in which the tool holder 3 for holding the tool 2 is attached to the main spindle 4. Usually, the tool holder 3 is properly attached in a state shown in FIG. 2A. However, when chips 94 are attached to this engaging portion as shown in FIG. 2B, the tool holder 2 is attached while the axis is being inclined. When machining is conducted in this state in which the axis is inclined, deviation is caused in the tool 2, and the machining accuracy of machining a workpiece is deteriorated.

A technique, by which it is detected whether or not chucking is properly conducted in the tool holder 3, is disclosed in the Japanese publications of unexamined patent applications of JP-A-2004-276145, 2004-42208, 2003-334742 and 2002-200542, which are applications made by the present applicant. According to these applications, a distance to the tool flange 3b of the tool holder 3 is measured by a displacement sensor such as an eddy current sensor, and the occurrence of an abnormality of a state in which the tool holder 3 is attached to the main spindle 4 is judged according to measurement data obtained in this measurement.

SUMMARY OF THE INVENTION

According to the abnormality judging method disclosed in the above patent documents, the impedance of the displacement sensor is changed according to a distance to the tool flange 3b. For example, in the case of an eddy current sensor, the inductance is changed. Therefore, when an AC signal is impressed upon the displacement sensor and a voltage level of a signal, which appears in this displacement sensor, is detected, the distance to the tool flange 3b can be measured.

In order to impress the AC signal upon the displacement sensor, an amplifying unit is used. This amplifying unit includes: an oscillating circuit for generating the AC signal; and a tuning circuit connected to the displacement sensor so that an electrical circuit including the displacement sensor can be made into a resonance circuit with respect to the AC signal.

Internal impedance characteristics of the displacement sensors are different from each other according to the type and the difference between the individual bodies. Therefore, when an amplifying unit is used being combined with each displacement sensor, it is necessary that the internal impedance constant of the tuning circuit is adjusted according to the internal impedance characteristic of the displacement sensor.

However, it is conventionally very difficult for a worker to adjust the tuning circuit in a work site. Therefore, conventionally, the same displacement sensor and the same amplifying unit, which have already been combined and adjusted with each other, are used. For the above reasons, in the case where the displacement sensor is damaged, not only the damaged displacement sensor but also the amplifying unit must be replaced with a new one, which is uneconomical.

In the conventional machine tool, the sensor head and the amplifying unit are arranged at different positions. Therefore, it is difficult to detach the sensor head, which is connected to the amplifying unit, from the machine tool.

Further, in the conventional machine tool, the displacement sensor and the amplifying unit, which are combined with each other at the time of shipment, are used as they are. Therefore, a means for evaluating the impedance characteristic of an amplifying unit with respect to each displacement sensor is not provided. For the above reasons, for example, with respect to another displacement sensor which is different from the displacement sensor combined at the time of shipment, it is impossible to evaluate whether or not combination with the displacement sensor is appropriate.

In view of the above circumstances, it is an object of the present invention to provide a machine tool in which a tool holder having a tool is attached to a main spindle and a workpiece is machined by rotating the main spindle, the machine tool characterized in that: an AC signal is impressed from an amplifying unit upon a displacement sensor, the impedance of which changes according to a distance from a tool holder; a state, in which the tool holder is attached to the main spindle, is judged according to a signal level appearing in the displacement sensor; tuning of an amplifying unit connected to the displacement sensor can be easily conducted in a work site, so that the displacement sensor can be replaced in the work site; and a maintenance cost, caused when the displacement sensor is damaged, can be reduced.

Another object of the present invention is to make it easy to detach the displacement sensor and replace it.

Still another object of the present invention is make it possible to evaluate whether or not a combination of the displacement sensor with the amplifying unit is appropriate.

In order to accomplish the above object, a machine tool of the present invention includes an impedance adjustment circuit in which an internal impedance constant of a tuning circuit connected to a displacement sensor and composing a resonance circuit together with the displacement sensor can be changed by a digital signal and the digital signal is outputted to this tuning circuit so as to adjust the internal impedance constant.

A machine tool of the present invention includes an impedance adjustment circuit in which a tuning circuit is connected to a displacement sensor and an impedance of a circuit including the displacement sensor and the tuning circuit is adjusted by adjusting an oscillating frequency of an oscillating circuit.

Further, in a machine tool of the present invention, a displacement sensor and an amplifying unit, which includes the tuning circuit, are connected to each other by a detachable connector.

Further, a machine tool of the present invention includes an eddy current sensor to be used as a displacement sensor. A machine tool of the present invention further includes: a variable induction circuit; and a switching device for switching between the variable induction circuit and the eddy current sensor.

BRIEF DESCRIPTION OF THE DRAWINGS

The present invention will be more clearly understood from the description as set below with reference to the accompanying drawings, wherein.

DESCRIPTION OF THE PREFERRED EMBODIMENTS

Preferred embodiments of the present invention will be described in detail below while referring to the attached figures.

Figure 1:
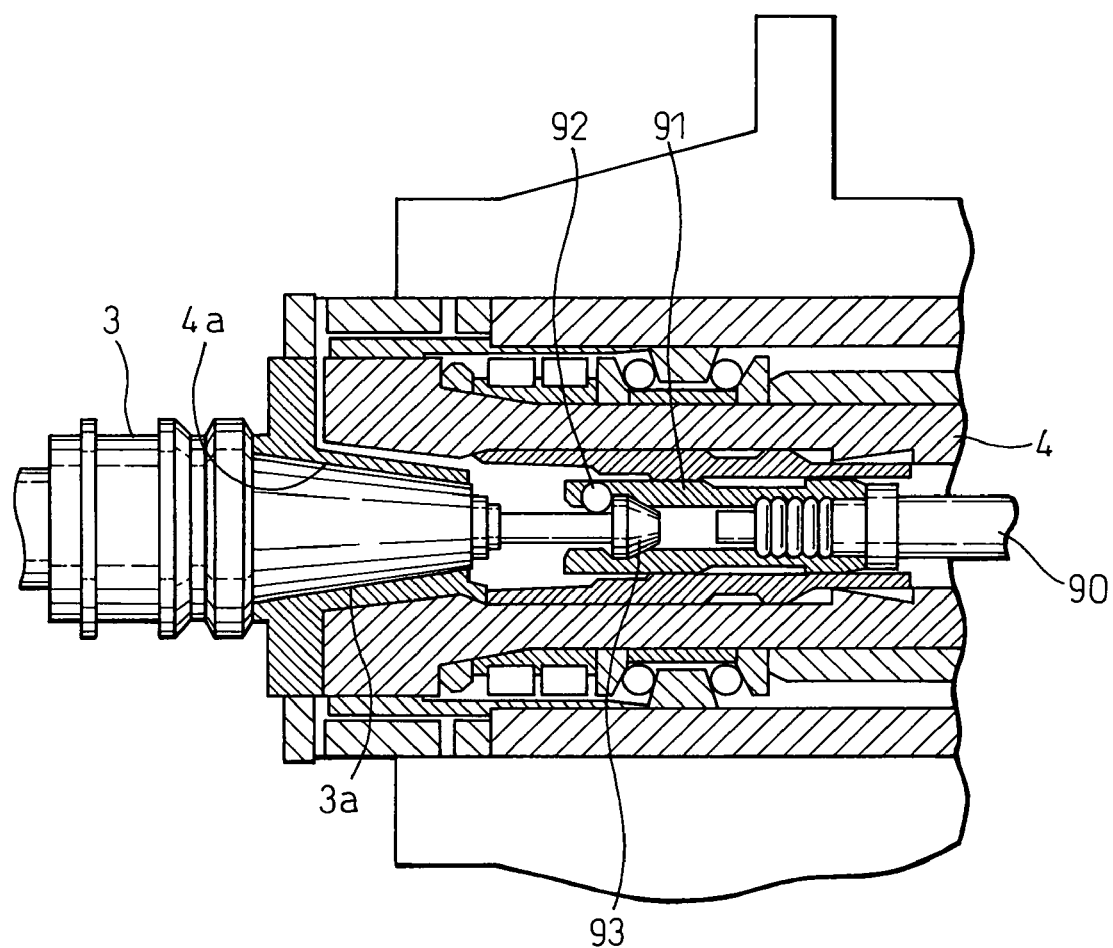
FIG. 1 is a sectional view showing a state in which a tool holder is attached.
Figure 2A:
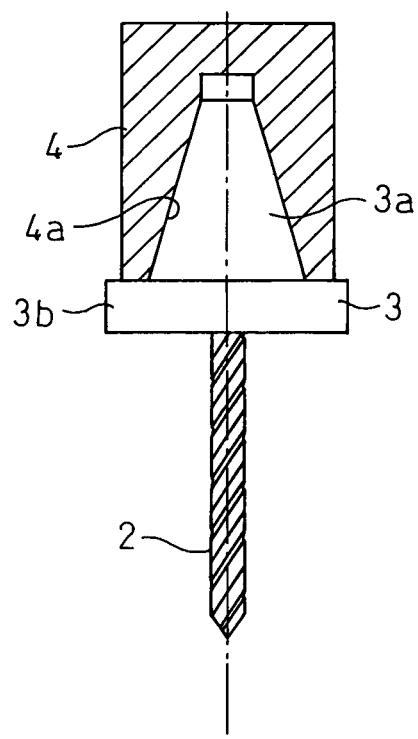
FIGS. 2A and 2B are schematic illustrations showing a state in which a tool holder is attached.
Figure 2B:
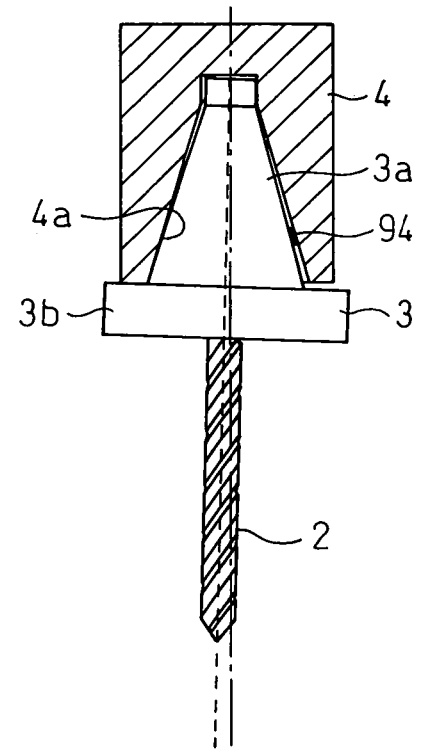
Figure 3:
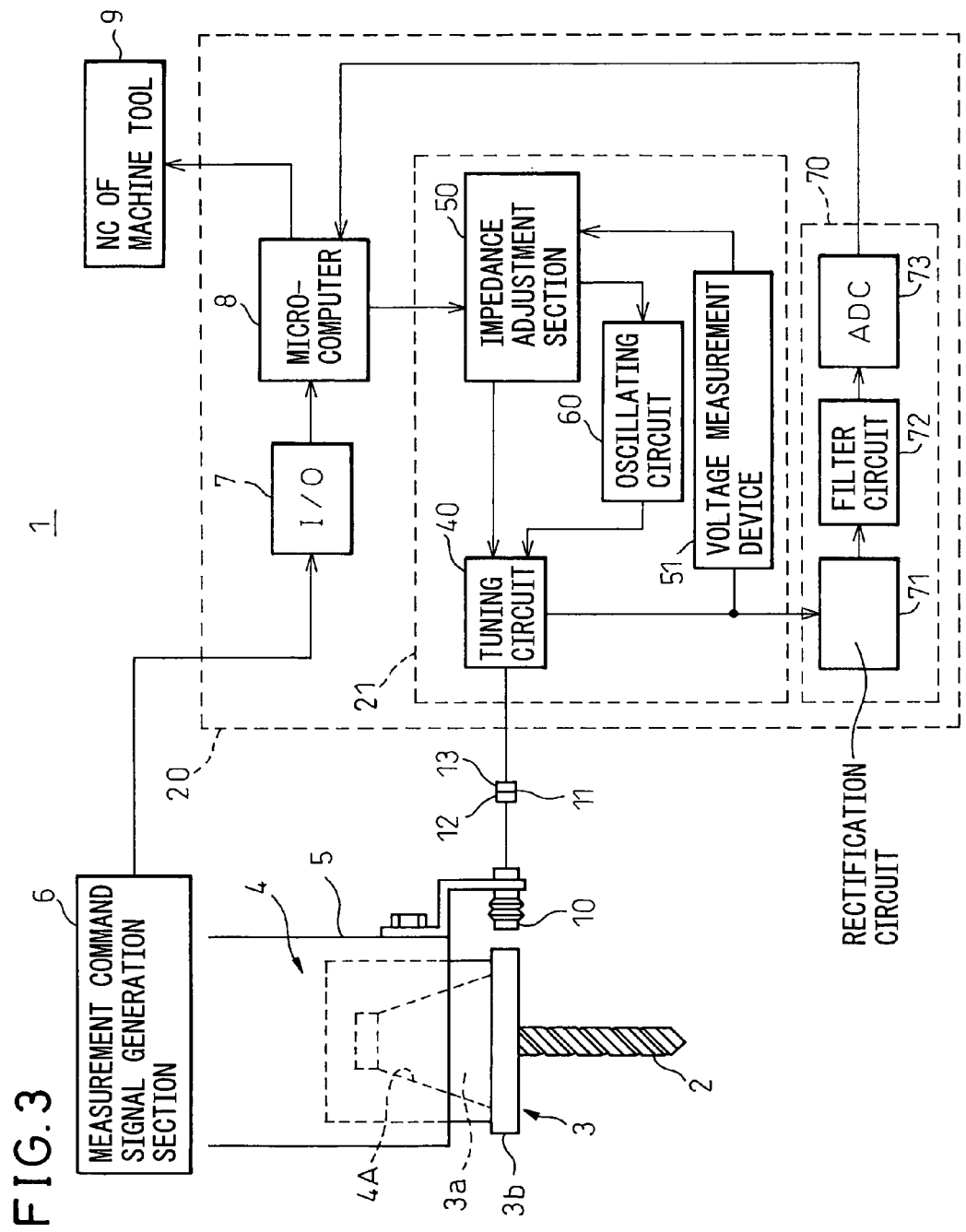
FIG. 3 is an arrangement view showing an outline of a first embodiment of a machine tool of the present invention.

FIG. 3 is an arrangement view showing an outline of a first embodiment of a machine tool of the present invention. A machine tool 1 is an MC in which various tools are automatically selected by an ATC device according to a machining process and the thus selected tool is automatically attached to a main spindle so as to conduct machining on a workpiece.

The present invention will be explained below by referring to the example of an MC. However, it should be noted that the present invention is not limited to the above specific embodiment. As long as it is a machine tool having a function of attaching and detaching a tool, the present invention can be widely applied. For example, the present invention can be applied to a machine tool such as a tapping machine or a compound lathe. A machine to which the present invention is applied is not necessarily provided with ATC function.

The machine tool 1 includes: a main spindle 4 to which a tool holder 3 having a tool 2 is attached; a displacement sensor 10, which is a sensor head of the present invention, for measuring a distance from an outer circumferential face of a tool flange 3b of the tool holder 3; and an amplifying unit 20 for analyzing a signal inputted from the displacement sensor 10 and converting the signal into a piece of distance information.

Concerning the displacement sensor 10, a sensor such as an eddy current sensor, in which impedance is changed according to a distance from an object to be measured, is used. In the following example, explanations are made into a case in which the displacement sensor 10 is an eddy-current sensor. However, the displacement sensor 10 used for the present invention is not limited to a specific eddy-current sensor. As long as it is an impedance measurement type system in which a combined adjustment is needed, any sensor head 10 and amplifying unit 20 can be used for the present invention. For example, an electrostatic capacity type sensor may be used for the displacement sensor 10 of the present invention. The displacement sensor 10 is attached to the head 5, to which the main spindle 4 is attached, via a bracket.

The amplifying unit 20 includes: a sensor drive circuit 21 for supplying an AC signal (exciting signal) to the displacement sensor; a detection circuit 70 for detecting a signal level appearing in the displacement sensor; and a microcomputer 8 for receiving measurement data, which has been detected by the detection circuit 70, and for collecting and analyzing the data so as to judge an abnormality of a state in which the tool holder 3 is attached to the main spindle 1 and for outputting a result of judgment to NC control unit 9 to conduct numerical control (NC) of the machine tool 1.

The sensor drive circuit 21 of the amplifying unit 20 includes: an oscillating circuit 60 for supplying an AC signal to the displacement sensor 10; a tuning circuit 40, which is an impedance circuit of the present invention for forming a resonance circuit together with the displacement sensor 10 with respect to an AC signal, connected between the displacement sensor 10 and the oscillating circuit 60; and an impedance adjustment circuit 50 for adjusting an internal impedance constant of the tuning circuit 40.

The detection circuit 70 includes: a rectification circuit 71 for rectifying a signal voltage appearing in the displacement sensor; a filter circuit 72 for removing a high frequency component from the rectified signal so as to pick up a DC component; and an analog-digital converter (ADC) 73 for converting an analog voltage signal, which has passed through the filter circuit 72, into a digital voltage signal. A digital signal showing an amplitude of the AC signal voltage appearing in the displacement sensor is generated and sent to the microcomputer 8. In this connection, in the case where the microcomputer 8 is provided with a A/D converting function, ADC 73 is not needed. An analog circuit capable of conducting the processing described above may be used as substitute.

Figure 4:
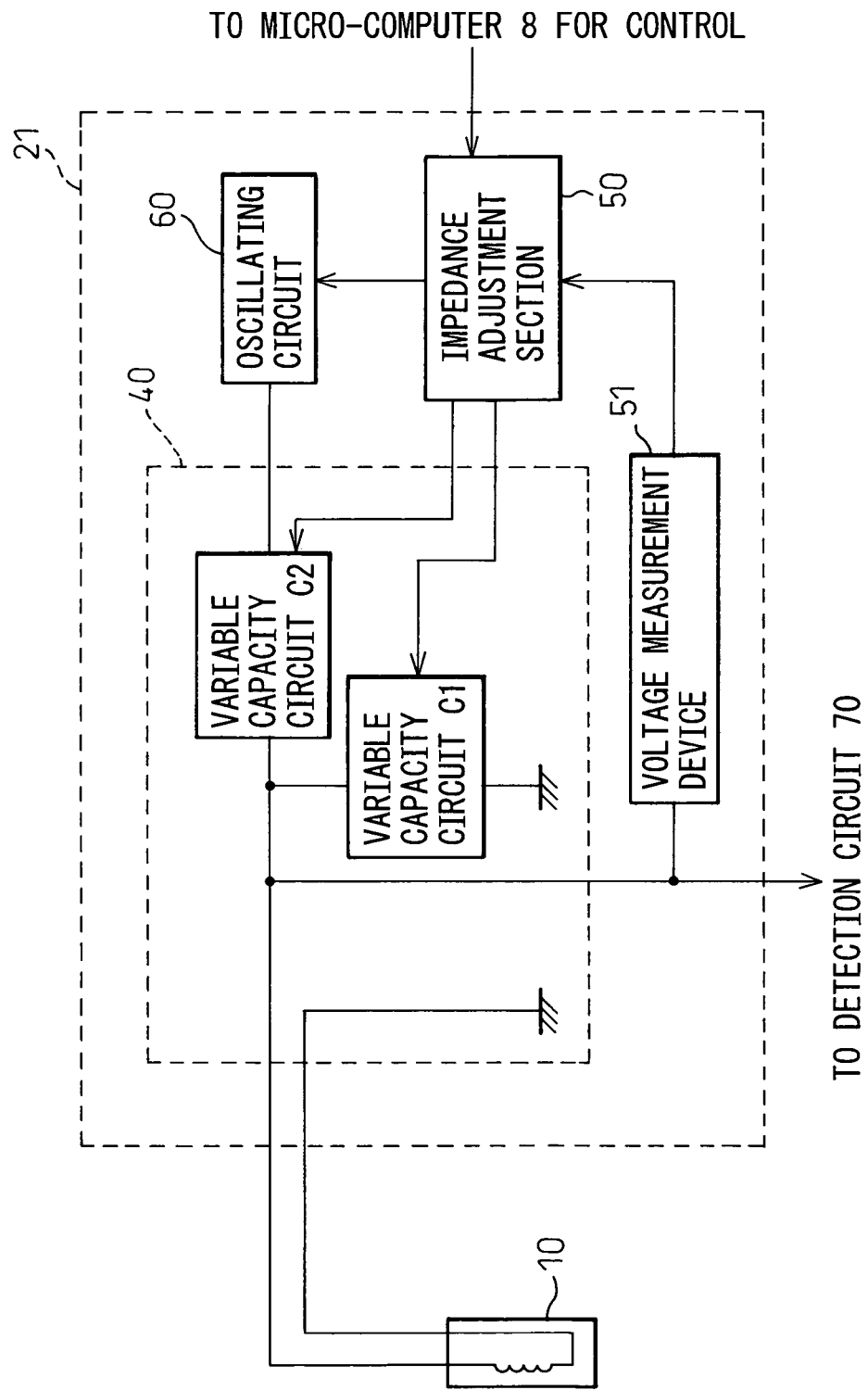
FIG. 4 is an arrangement view showing a first example of an arrangement of a sensor drive circuit to which a displacement sensor is connected.

FIG. 4 is an arrangement view showing a first example of an arrangement of the sensor drive circuit 21 to which the displacement sensor 10 is connected. The tuning circuit 40 includes: a variable capacity circuit C1 connected in parallel with the oscillating circuit 60 and the displacement sensor 10; and a variable capacity circuit C2 connected in series with the oscillating circuit 60 and the displacement sensor 10.

An inductance value of the eddy-current sensor 10 is changed according to a distance to an outer circumferential face of the tool flange 3b of the tool holder 3 made of metal. Accordingly, when an AC signal is supplied to the eddy-current sensor 10 from the oscillating circuit 60, a voltage level of the signal appearing in the eddy-current sensor 10 is changed according to the distance to the outer circumferential face of the tool flange 3b of the tool holder 3. This change in the voltage level is read out by the microcomputer 8 via the detection circuit 70, so that the distance to the outer circumferential face of the tool flange 3b can be measured. In this connection, concerning the material of the tool holder, as long as its magnetism is different from that of air, the material is not necessarily limited to metal.

The tuning circuit 40 is used for making the circuit, which includes the eddy-current sensor 10 and the tuning circuit 40, resonate (be in tune) with respect to an AC signal impressed from the oscillating circuit 60 in order to detect the voltage level of the signal appearing in the eddy current sensor 10 with predetermined detection accuracy.

Figure 5:
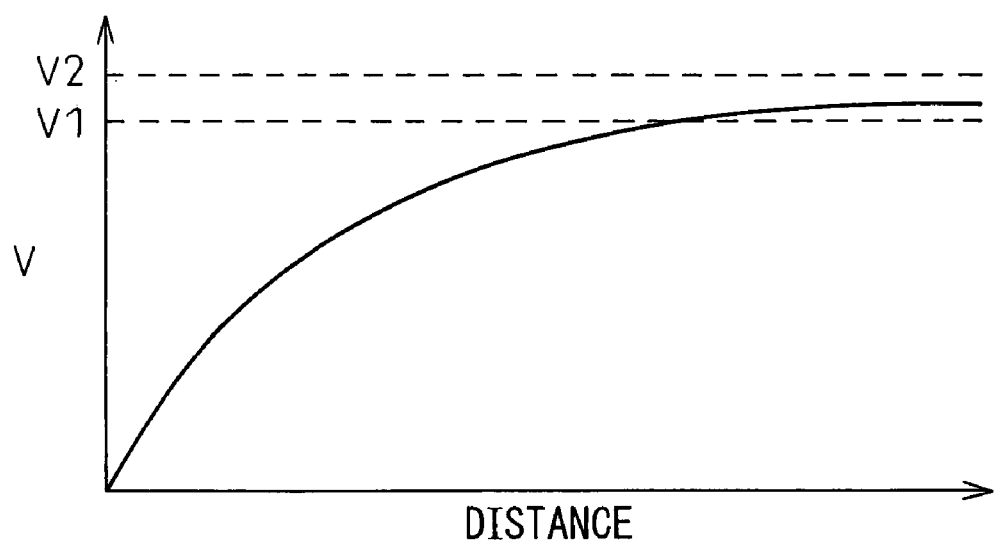
FIG. 5 is a schematic illustration for explaining a preferable state of adjustment of a tuning circuit shown in FIG. 4.

As shown in FIG. 5, the internal impedance of the tuning circuit 40 is adjusted as follows. Under the condition that no metallic components are arranged in the periphery of the eddy current sensor 10, that is, under the condition that a distance to the outer circumferential face of the tool flange 3b is infinite, the internal impedance of the tuning circuit 40 is adjusted so that a resonance state can be shown in which a voltage level V of the signal appearing in the eddy current sensor 10 can be maximized or minimized with respect to the distance and so that the voltage level can be in a predetermined voltage level range (V1 to V2) at that time.

In this connection, the adjustment may be made under the condition that metallic components are located in the periphery. For example, the adjustment may be made while a predetermined metallic block is being attached. The voltage level at the time of adjustment may not be a maximum when d is infinite. For example, the adjustment may be made so that the voltage level can be maximized when a gap formed between the sensor and a metallic component located in the periphery is set as a predetermined gap. The adjustment may be made by using a differential coefficient of the distance or the adjustment capacity. Further, an adjustment point of the voltage level V of the signal appearing in the eddy current sensor 10 is not limited to the maximum value of the voltage. According to the constitution of the internal circuit of the sensor drive circuit 21, the adjustment point may be the minimum value of the voltage. Alternatively, the adjustment point may be a specific voltage.

The present invention is composed so that capacity values of the variable capacity circuits C1 and C2 can be controlled by digital signals inputted from the outside of these elements. When the impedance adjustment section 50 changes values of the digital signals outputted to the variable capacity circuits C1 and C2 according to the adjustment algorithm explained as follows, the capacity values of these variable capacity circuits C1 and C2 can be changed. In this connection, in the following explanations, a digital signal outputted from the impedance adjustment section 50 for changing the capacity value of each of the variable capacity circuits C1 and C2 is referred to as "a capacity value control signal". In the case where the capacity value is adjusted by an analog signal, an analog signal outputted from the impedance adjustment section 50 for changing the capacity value of each of the variable capacity circuits C1 and C2 is referred to as "a capacity value control signal".

Figure 6:
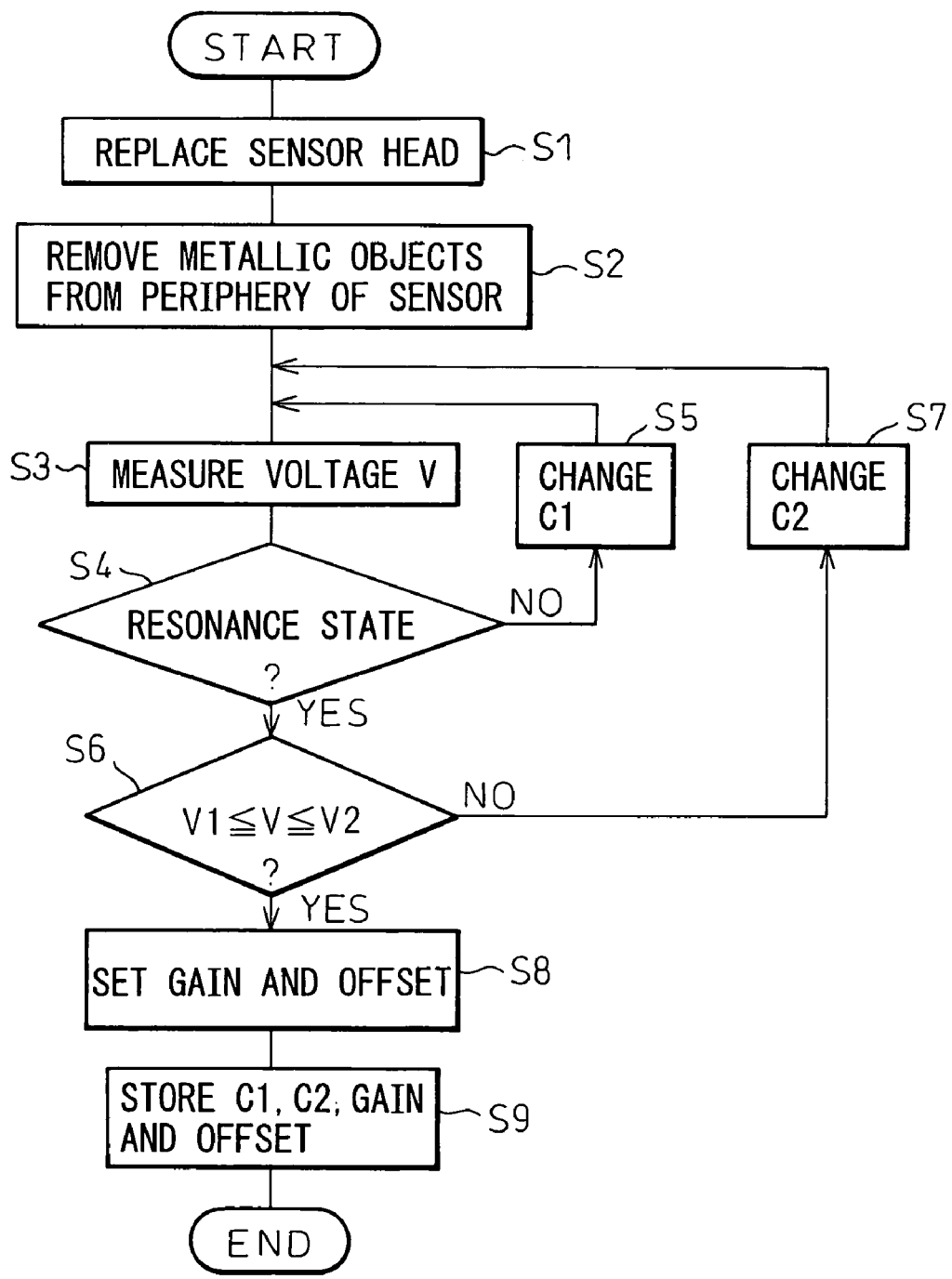
FIG. 6 is a flow chart showing a procedure of replacing an eddy current sensor.
Figure 7:
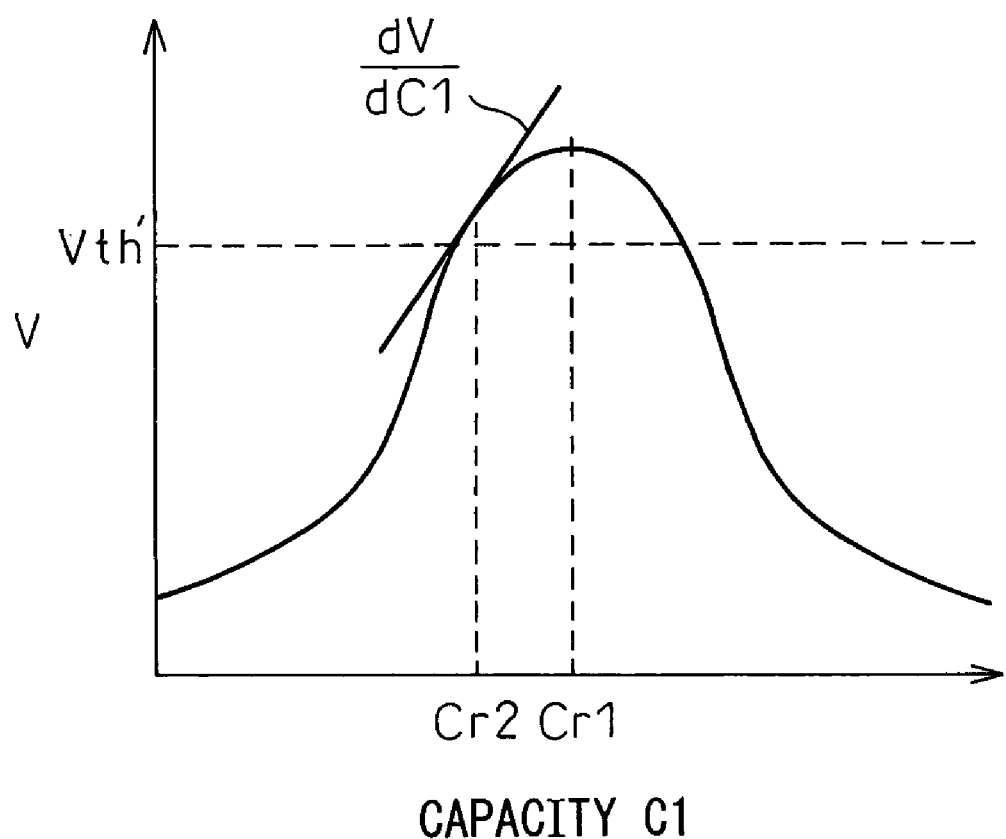
FIG. 7 is a schematic illustration showing a method of adjustment conducted by an impedance adjustment section shown in FIG. 4.

Referring to FIGS. 6 and 7, explanations will be made into an adjustment motion of adjusting the capacity value of each of the variable capacity circuits C1 and C2 conducted by the impedance adjustment section 50. FIG. 6 is a flow chart of the procedure of replacing the eddy current sensor 10, and FIG. 7 is a schematic illustration of the method of adjustment made by the impedance adjustment section 50.

First of all, in step S1, only a forward end portion, which is a measuring coil portion of the eddy current sensor 10, is detached from the amplifying unit 20, and a forward end portion of the eddy current sensor 10 to be newly attached is attached to the amplifying unit 20 and the eddy current sensor 10 is arranged in a previously prepared measurement environment.

In step S2, all metallic components are removed from the periphery of the eddy current sensor 10. In this step S2, a state is formed in which a distance to the outer circumferential face of the tool flange 3b is infinite.

In this state, the impedance adjustment section 50 measures a voltage level V appearing in the eddy current sensor 10 with the voltage measurement device 51 (step S3).

In step S4, the impedance adjustment section 50 judges whether or not the circuit including the eddy current sensor 10 and the tuning circuit 40 is in a resonance state.

For example, the impedance adjustment section 50 judges whether or not the voltage level V, which has been measured currently, is a maximum or minimum value from the preceding values of the voltage level V, which has already been measured, while the variable capacity circuit C1 is being changed.

Judging whether the voltage level V is the maximum value or the voltage level V is the minimum value depends on the circuit structure of the circuit including the eddy current sensor 10 and the tuning circuit 40.

Accordingly, the impedance adjustment section 50 judges whether a ratio of change in the voltage level V, which has been measured by changing the variable capacity circuit C1, is not more than a predetermined value, or a ratio of change in the voltage level V is in a predetermined range of a ratio of change in the voltage level V which is previously estimated to be measured when the circuit is in a resonance state.

When it is judged that the circuit is in a resonance state as a result of the judgment made in step S4, the program proceeds to step S6. When it is judged that the circuit is not in a resonance state as a result of the judgment made in step S4, the impedance adjustment section 50 outputs a digital signal for directing a capacity value to the variable capacity circuit C1 in step S5, and the capacity value is changed. Until the circuit is put into a resonance state, steps S3 to S5 are repeated. FIG. 7 is a graph showing a change in the voltage level V accompanied by the variable capacity circuit C1. By steps S3 to S5 described above, the variable capacity circuit C1 is adjusted to be the capacity Cr1 at which the circuit is put into a resonance state.

In step S6, it is judged whether or not the voltage level V is in a predetermined voltage range V1 to V2. When the voltage level V is in the predetermined voltage range V1 to V2 as a result of the judgment made in step S6, the program proceeds to step S8.

In the case where the voltage level V is not in the predetermined voltage range V1 to V2, when the impedance adjustment section 50 outputs a digital signal for directing a capacity value to the variable capacity circuit C2 in step S7, the capacity value is changed. Until the voltage level V becomes a value in the predetermined range V1 to V2, steps S3 to S7 are repeated. At this time, when the value of the variable capacity circuit C2 is changed, a state of resonance of the circuit is changed. Therefore, each time the value of the variable capacity circuit C2 is changed, steps S3 to S5 are repeated.

In step S6, instead of judging whether or not the value of the voltage level V is in the predetermined range Vt1 to Vt2, it is judged whether or not the value of the voltage level V, which has been measured currently, is the maximum value from the preceding values of the voltage level V which have already been measured while the variable capacity circuit C2 is being changed. Due to the foregoing, with respect to the change in the variable capacity circuit C2, the variable capacity circuit C2 may be adjusted so that the value of the voltage level V can be the maximum value.

Alternatively, when it is judged whether or not the value of the voltage level V, which has been measured currently, is the minimum value from the preceding values of the voltage level V which has been already been measured while the variable capacity circuit C2 is being changed, the variable capacity circuit C2 may be adjusted so that the value of the voltage level V can be the minimum value with respect to the change in the movable capacity circuit C2. Whether the value of the voltage level V is adjusted to the maximum value or the minimum value depends upon the circuit structure of the circuit including the eddy current sensor 10 and the tuning circuit 40.

In step S8, in order to convert a deviation value and an indication value of the voltage level V of the signal appearing in the eddy current sensor 10 into appropriate digital values in the circuit in the latter state, that is, in the detection circuit 70, the microcomputer 8 adjusts a gain and offset of ADC 73 of the detection circuit 70.

After the adjustment has been completed in steps S1 to S8, in step S9, the impedance adjustment section 50 stores the values of the variable capacity circuits C1 and C2 (or the outputs of the variable capacity circuits C1 and C2) determined in steps S3 to S7, and the microcomputer 8 stores the values of the gain and the offset determined in step S8.

The impedance adjustment section 50 for realizing the above operation includes: a microcomputer, which carries out software to realize the above adjustment algorithm; software; and memory elements for storing C1 and C2. Alternatively, the impedance adjustment section 50 for realizing the above operation includes a microcomputer into which these components are incorporated.

In step S2, instead of removing metallic components from the periphery of the eddy current sensor 10, a metallic component, the shape of which has been already been known, may be arranged at a position distant from the eddy current sensor 10 by a predetermined distance. Further, in step S4, instead of adjusting the variable capacity circuit C1 to the capacity Cr1 by which the circuit is put in a resonance state, the variable capacity circuit C1 may be adjusted to the capacity Cr2 by which the differential value (dV/dC1) becomes a value not more than a predetermined value.

An oscillating circuit such as a programmable wave-form generator, in which an oscillating frequency can be freely set, may be used for the oscillating circuit 60. Concerning the impedance adjustment section 50, instead of adjusting the capacity of the variable capacity circuit C1 or C2, when the oscillating frequency of the oscillating circuit 60 is changed, the impedance of the eddy-current sensor 10 and the tuning circuit 40 may be adjusted, and the circuit including the eddy-current sensor 10 and the tuning circuit 40 may be adjusted to be in a resonance state. Alternatively, the voltage level V of the signal appearing in the eddy current sensor 10 may be adjusted.

When the impedance adjustment section 50 automatically adjusts the tuning circuit 40 of the sensor drive circuit 21 as described above, the adjustment work for tuning the eddy current sensor 10 to the amplifying unit 20, which has been conventionally conducted only at the time of shipment, can be conducted at a work site. Due to the foregoing, without replacing the amplifying unit 20, only the eddy current sensor 10 can be replaced at the work site.

Referring to FIG. 3 again, in the machine tool 1 of the present invention, it is possible to replace only the eddy current sensor 10 without replacing the amplifying unit 20. Therefore, the tuning circuit 40 of the amplifying unit 20 and the eddy current sensor 10 can be easily connected to each other by a detachable connector structure.

Conventionally, it has been difficult for the adjustment work, for tuning the eddy current sensor 10 to the amplifying unit 20, to be conducted at a work site. Therefore, it is impossible to connect the eddy current sensor 10 with the amplifying unit 20 by an extension cable. The reason is that the impedance characteristic is changed when the extension cable is used for connection.

According to the machine tool 1 of the present invention, even when the impedance of the circuit including the eddy current sensor 10 and the tuning circuit 40 is changed by using the extension cable for connection, the tuning circuit 40 of the amplifying unit 20 can be automatically adjusted by the impedance adjustment section 50. Therefore, the sensor side end 12 of the connector 11 and the amplifying unit side end 13 can be connected to each other by an extension cable.

A connector such as IP 68, which is excellent in water-proof and the dust-proof properties, is preferably used for this connector 11. If possible, it is preferable to use a connector capable of being used in a liquid such as water. According to the environment of a work site in which the machine tool is used, it is preferable to use a connector having chemical-resistant and coolant-resistant properties. In the case where the connector 11 is provided in the middle of the cable for connecting the eddy current sensor 10 with the amplifying unit 20 as shown in FIG. 3, in order to prevent the occurrence of an error of the position at which the eddy current sensor 10 is attached, which is caused when the cable is pulled, it is preferable that the connector 11 is fixed to a fixed portion such as a spindle portion of the machine tool 1.

In this connection, the constitution of the tuning circuit 40 shown in FIG. 4 is only an example. Therefore, the present invention is not limited to this specific example. Therefore, as long as the tuning circuit 40 is a circuit connected between the displacement sensor 10 and the oscillating circuit 60 and the tuning circuit 40 can compose a resonance circuit together with the displacement sensor 10 with respect to an AC signal generated by the oscillating circuit 60 when the internal impedance constant is adjusted, any constitution can be adopted and realized.

Concerning the AC signal generated by the oscillating circuit 60, it is possible to adopt various AC signals such as a sine wave signal, a square wave signal and a saw-tooth wave signal. Concerning the oscillating circuit 60, it is possible to use an analog oscillating circuit. Alternatively, it is possible to use a digital oscillating circuit such as a direct digital synthesizer (DDS).

Figure 8A:
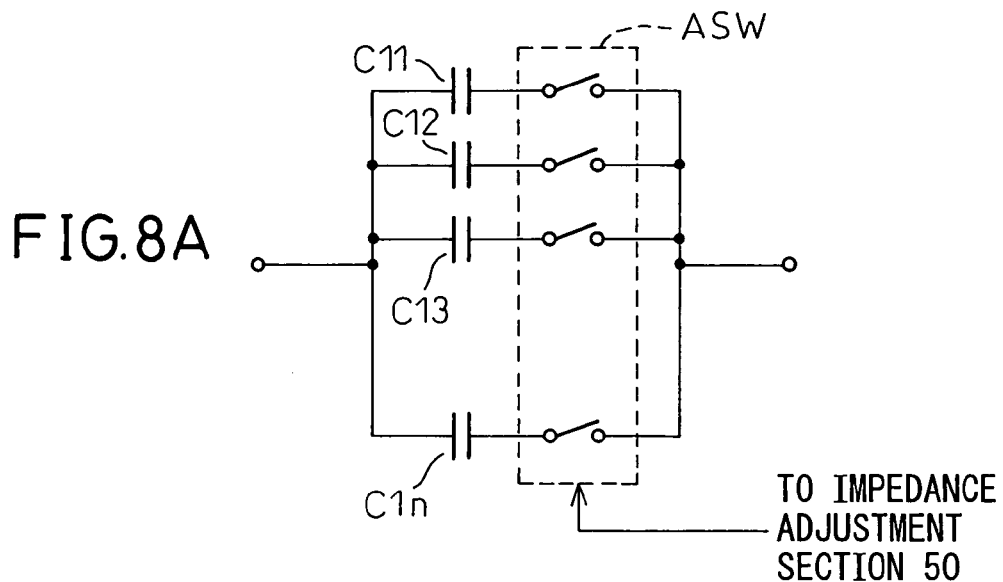
FIG. 8A is a view showing a first example of an arrangement of a variable capacity circuit.
Figure 8B:
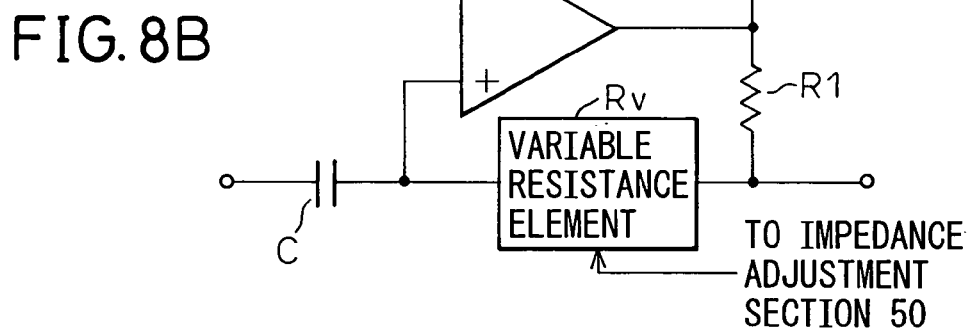
FIG. 8B is a view showing a second example of an arrangement of a variable capacity circuit.
Figure 8C:
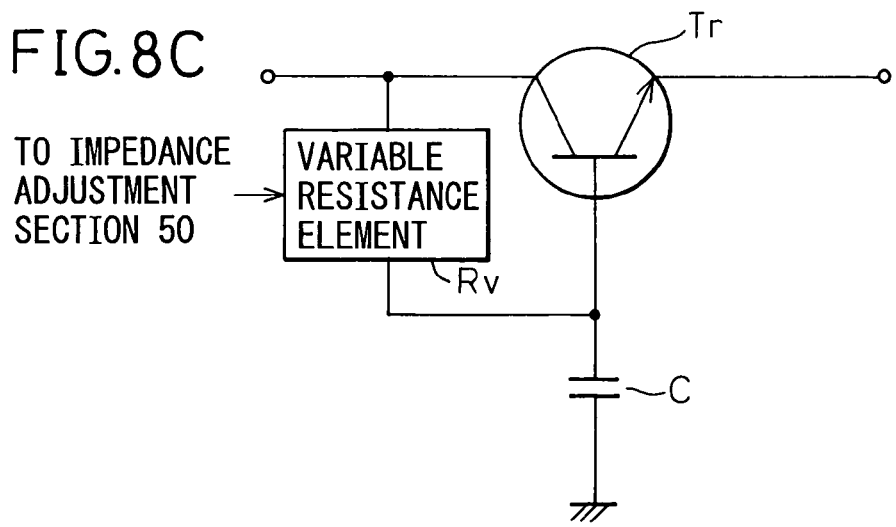
FIG. 8C is a view showing a third example of an arrangement of a variable capacity circuit.
Figure 9A:
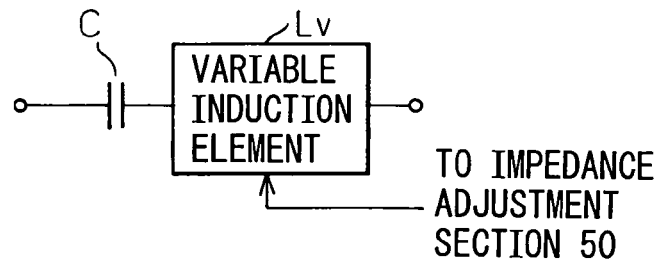
FIG. 9A is a view showing a fourth example of an arrangement of a variable capacity circuit.
Figure 9B:
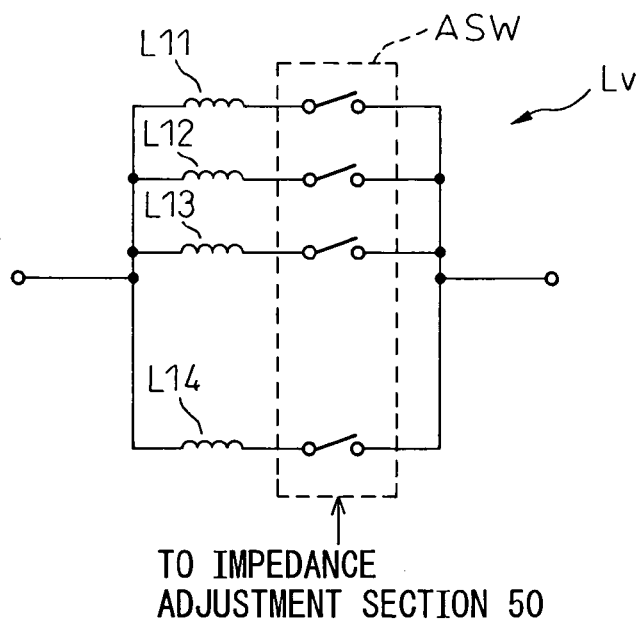
FIG. 9B is a view showing a first example of an arrangement of a variable induction element of FIG. 9A.
Figure 9C:
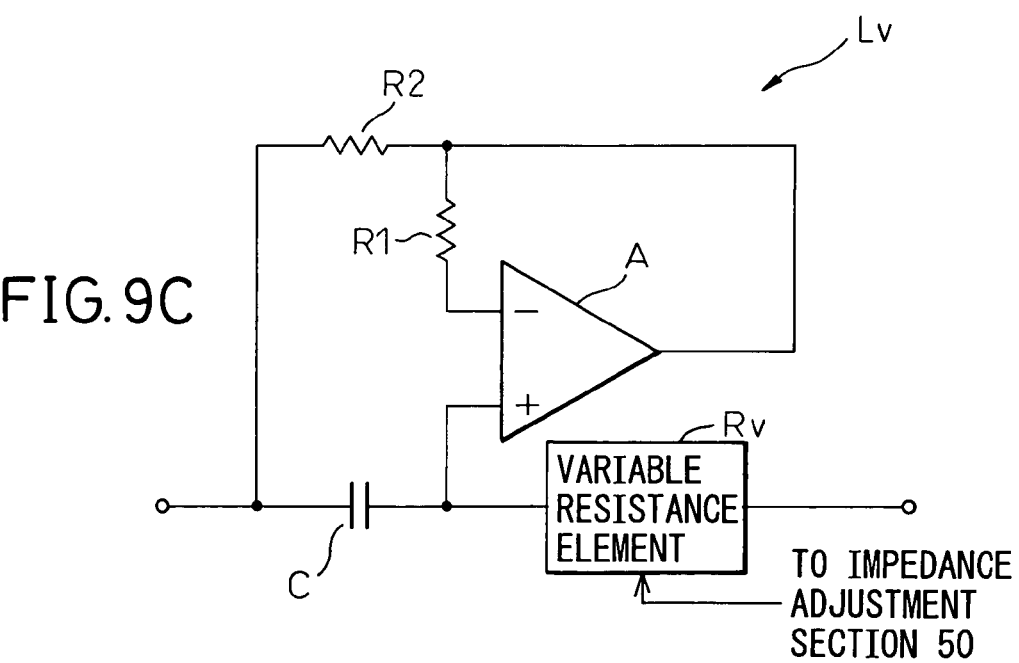
FIG. 9C is a view showing a second example of an arrangement of a variable induction element of FIG. 9A.

Referring to FIGS. 8A, 8B, 8C, 9A, 9B and 9C, explanations will be made into an example of the circuit structure for realizing the variable capacity circuits C1 and C2. FIG. 8A is a view showing a first example of the variable capacity circuit C1, C2. FIG. 8B is a view showing a second example of the variable capacity circuit C1, C2. FIG. 8C is a view showing a third example of the variable capacity circuit C1, C2. FIG. 9A is a view showing a fourth example of the variable capacity circuit C1, C2. FIG. 9B is a view showing a first example of an arrangement of a variable induction element of FIG. 9A. FIG. 9C is a view showing a second example of an arrangement of a variable induction element of FIG. 9A.

As shown in FIG. 8A, the variable capacity element may include: a plurality of capacity elements C11, C12, C13, . . . C1n; and an analog switch ASW for selectively connecting these capacity elements. In this case, for example, the value of each capacity element is set in such a manner that C11=10 pF, C12=20 pF, C13=40 pF, . . . C1n=$10 \times 2^{(n-1)}$ pF. When an ON/OFF operation of each contact point of the analog switch ASW is controlled by a digital signal outputted from the impedance adjustment section 50, the value of the variable capacity element can be digitally changed.

In this connection, in order to reduce an influence given to a resistance component of the variable capacity element, it is preferable to use an analog switch ASW, the contact resistance of each contact point of which is not more than about 10 Ω. In this connection, with respect to a contact point connected to a capacity element of a relatively small capacity among the capacity elements C11, C12, C13, . . . C1n which are connected in parallel to each other, it is unnecessary to use an analog switch, the contact point resistance of which is low. That is, the analog switch of a low contact point resistance may be used only for a capacity element of a large capacity value. The reason is described as follows. When a capacity is small, a value of impedance to be converted into a resistance value is increased. Therefore, a contact point resistance of the analog switch ASW does not have much influence. A mechanical relay element may be used for the analog switch ASW. A capacitor or an inductance, the value of which can be changed over, may be used for the variable capacity circuits C1 and C2.

The variable capacity circuit can be realized by a virtual capacity circuit in which an integral circuit shown in FIG. 8B or 8C is used. In this virtual capacity circuit, when a value of the variable resistance element Rv is changed by the impedance adjustment section 50, the value of the variable capacity circuit can be changed.

As shown in FIG. 9A, the variable capacity circuit can be realized by combining a capacity element C, the capacity of which is fixed, with a variable induction element Lv. As shown in FIG. 9B, the variable induction element Lv may include: a plurality of induction elements L11, L12, L13, . . . L14 which are connected in parallel with each other; and an analog switch ASW for selectively connecting these induction elements. When an ON/OFF operation of each contact point of the analog switch ASW is controlled by a digital signal outputted from the impedance adjustment section 50, the value of the variable capacity element can be digitally changed.

In this connection, in order to reduce an influence given to the resistance component of the variable induction element, it is preferable to use an analog switch ASW, the contact resistance of each contact point of which is not more than about 10 Ω. However, with respect to a contact point connected to an element of a relatively high value among the capacity elements L11, L12, L13, . . . L14 which are connected in parallel to each other, it is unnecessary to use an analog switch, the contact point resistance of which is low.

The variable inductance element Lv can be realized by a virtual capacity circuit in which an integral circuit shown in FIG. 9C is used. In this virtual inductance circuit, when a value of the variable resistance element Rv is changed by the impedance adjustment section 50, the inductance value of the variable induction element can be changed.

Figure 10:
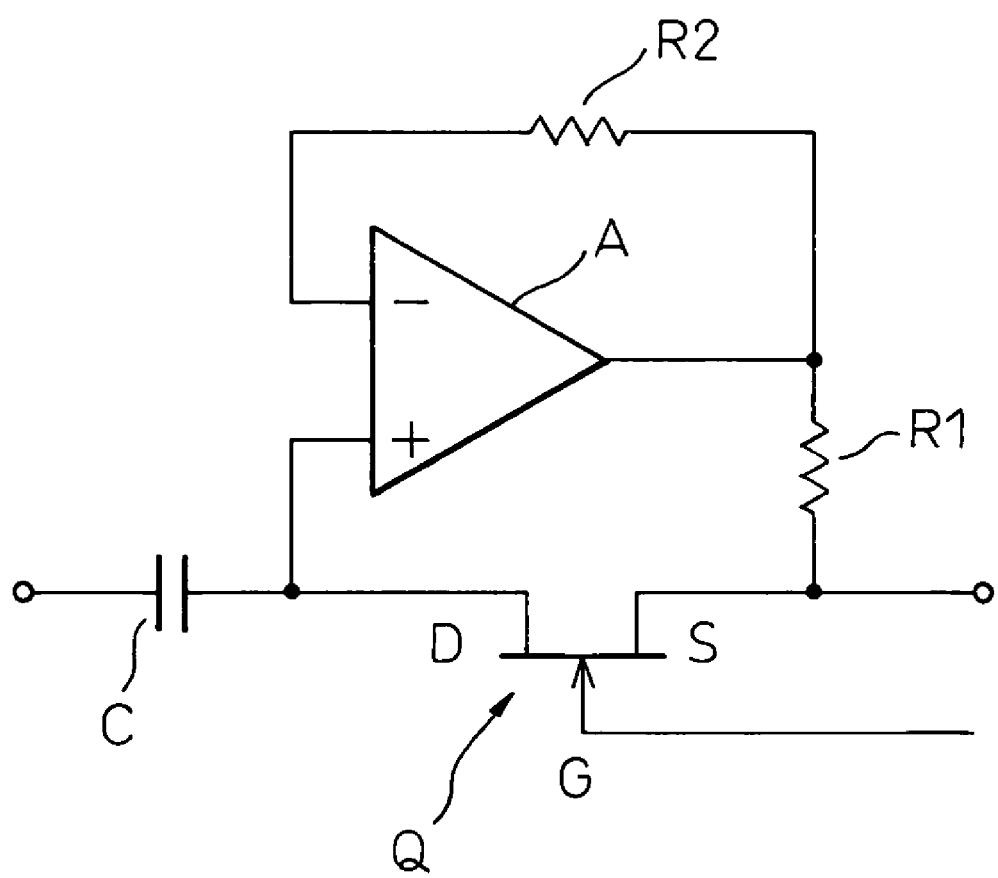
FIG. 10 is a view showing a fifth example of an arrangement of a variable capacity circuit.

In FIGS. 8B, 8C and 9C, the variable resistance element Rv included in the integral circuit may be realized by a discrete device such as FET, a bipolar transistor or an analog photo-coupler. FIG. 10 is a view showing the fifth example of an arrangement of the variable capacity element in the case where JFET is used for the variable resistance element Rv in the variable capacity circuit shown in FIG. 8B. It is possible to adopt the same structure in the variable capacity element shown in FIG. 8C and the variable inductance element shown in FIG. 9C.

In the example of the arrangement shown in FIG. 10, when an input signal, which corresponds to a digital signal outputted from the impedance adjustment section 50, is impressed upon the gate electrode G of the discrete device Q of JFET, it becomes possible to change a resistance value between the source S and the drain D according to the digital signal.

However, in the case where the discrete device is used for the variable resistance element as described above, a resistance value of the variable resistance element is likely to change due to the temperature of the discrete device. Due to an influence of the change in the resistance value of the variable resistance element, a capacity value of the variable capacity circuit is changed.

Figure 11:
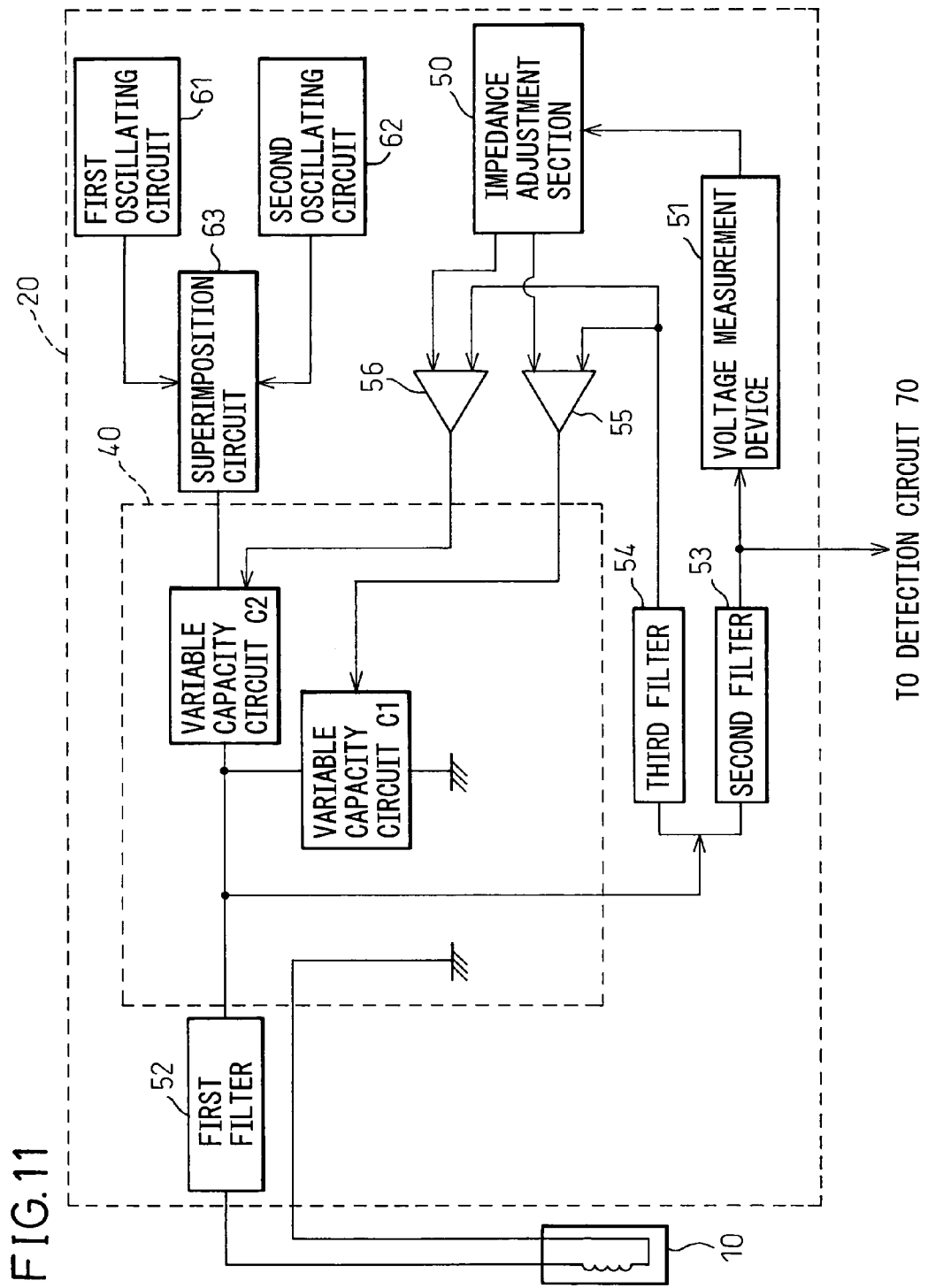
FIG. 11 is an arrangement view showing a second example of an arrangement of a sensor drive circuit.

Accordingly, in this case, it is preferable that the sensor drive circuit 21 is composed as shown in FIG. 11 and a compensation circuit for compensating for a change in the discrete device resistance value is provided.

FIG. 11 is an arrangement view showing the second example of the arrangement of the sensor drive circuit 21. In FIG. 11, the variable capacity element shown in FIGS. 8B or 8C or the variable capacity element shown in FIG. 9C having a variable induction element is used for the variable capacity circuits C1 and C2. As explained before by referring to FIG. 10, the discrete device is used for the variable resistance element Rv.

The sensor drive circuit 21 further includes: a first oscillating circuit 61 for generating and supplying an AC signal to be impressed upon the eddy current sensor 10; a second oscillating circuit 62 for generating and supplying a second AC signal, the frequency of which is different from that of the first AC signal generated by the first oscillating circuit 61; and a superimposition circuit 63 for superimposing the first and the second AC signal on each other and supplying the thus superimposed signal to the tuning circuit 40. In this connection, when the first oscillating circuit 61 and the second oscillating circuit 62 are realized by the above DDS, the first oscillating circuit 61 and the second oscillating circuit 62 may be composed of the same oscillating circuit.

The sensor drive circuit 21 further includes: a first filter circuit 52 for filtering the above superimposition signal so as to extract only the first AC signal and for impressing it upon the eddy current sensor 10; and a second filter circuit 53 for extracting only the first AC signal from the superimposition signal before filtering by the first filter circuit 52 and for outputting it to the detection circuit 70 and the voltage measurement device 51 described before. By this action of the second filter circuit 53, the influence given by the AC second signal to the detection circuit 70, and to the detection voltage of the voltage measurement device 51, can be removed.

The sensor drive circuit 21 further includes a third filter circuit 54 for extracting only the second AC signal as a monitor signal from the superimposition signal before filtering by the first filter circuit 52. By the actions of the first filter circuit 52 and the second filter circuit 54, it is possible to avoid an influence given by the fluctuation of inductance of the eddy current sensor 10 to the monitor signal extracted from the third filter circuit 54. A signal voltage level of the monitor signal depends upon only the impedance constants of the variable capacity circuits C1 and C2.

The extracted monitor signal is compared by the comparators 55, 56 with capacity value control signals which are outputted to the variable capacity circuits C1, C2 from the impedance adjustment section 50. By the signals showing a result of the comparison, capacity values of the variable capacity circuits C1, C2 are changed. When a feedback circuit is composed as described above, and which increases and decreases the resistance values of the variable resistance elements Rv in the variable capacity circuits C1, C2 according to the signal level of the monitor signal, the resistance value of the variable resistance element Rv is controlled so that the impedance constants of the variable capacity circuits C1, C2 can become constant and a change in the resistance value of the discrete device can be compensated for. In this connection, even if the resistance value is unnecessarily changed by a change in the external environment such as a temperature, when the structure of the present circuit is used, the resistance value of the discrete device can be stabilized.

Figure 12:
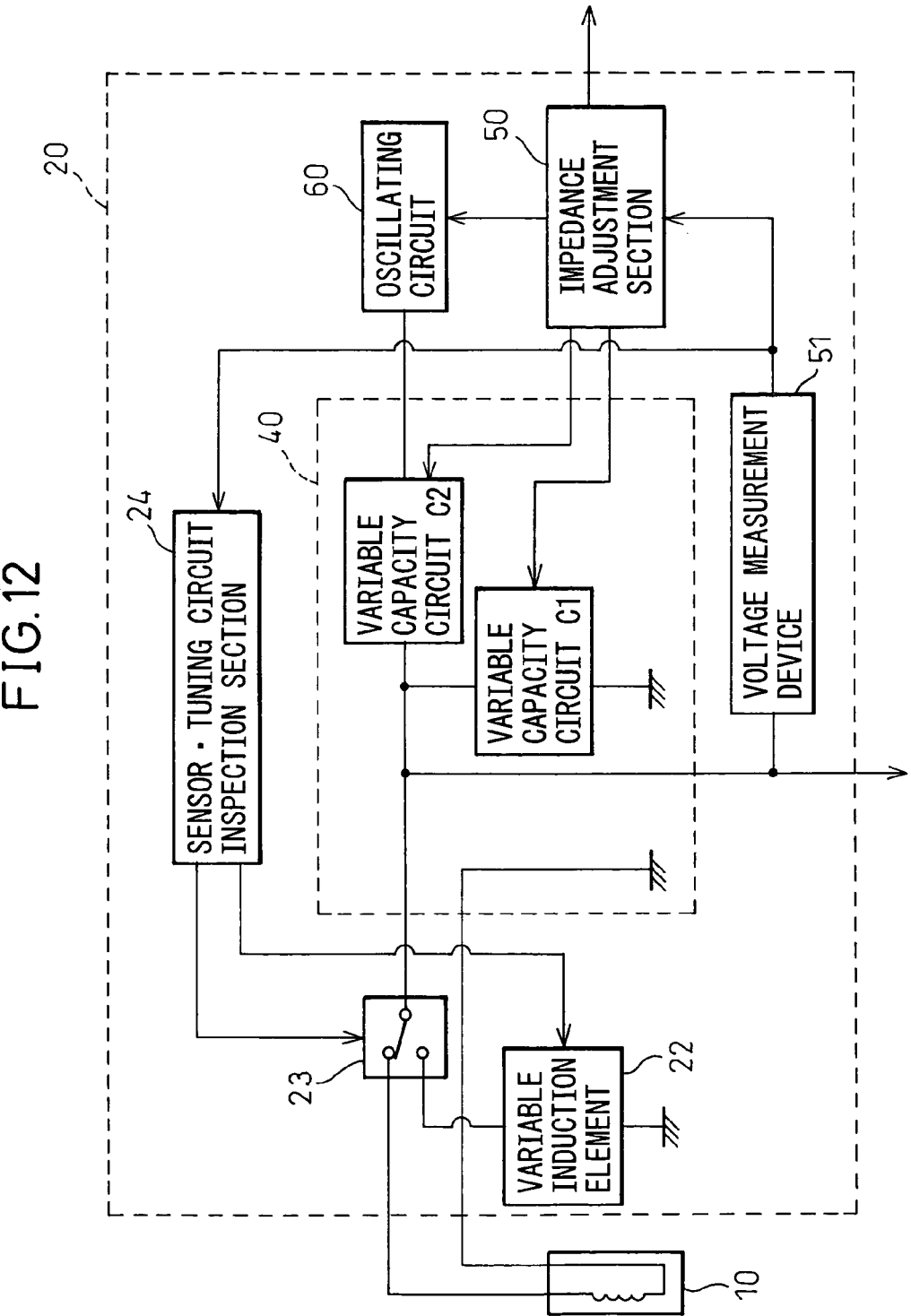
FIG. 12 is an arrangement view showing a third example of an arrangement of a sensor drive circuit.

FIG. 12 is an arrangement view showing the third example of the sensor drive circuit 21. In this example, the sensor drive circuit 21 includes a variable induction element 22 composed in the same manner as that shown in FIGS. 9B and 9C. The sensor drive circuit 21 further includes a switching device 23 for switching between the variable induction element 22 and the eddy current sensor 10 so as to connect it to the tuning circuit 40. Setting of the inductance value of the variable inductance element 22 and switching control of the switching device 23 are conducted by a sensor and tuning circuit inspection section 24.

The sensor and tuning circuit inspection section 24 connects the variable induction element 22 with the tuning circuit 40 by the switching device 23. When a gap which is formed between the eddy current sensor 10 and a metallic object such as a tool flange 3b is changed, a change in the inductance of the eddy current sensor 10 is simulated by using the variable induction element 22 and it is evaluated whether or not this combination of the eddy current sensor 10 with the tuning circuit 40 is appropriate.

For example, the sensor and tuning circuit inspection section 24 is provided with a storage means such as a memory element. In this storage means, an inductance characteristic of the eddy current sensor 10, which is connected to the sensor drive circuit 21 and is already known, is previously inputted and stored, that is, each value of inductance, which is measured when an interval between the eddy current sensor 10 and the metallic object is changed, is previously inputted and stored.

The variable induction element 22 is connected to the tuning circuit 40 by the switching device 23, and a value of the movable induction element 22 is changed according to the stored inductance characteristic of the eddy current sensor 10. When an output of the voltage measuring device 51 is detected at this time, it is possible to judge whether or not the combination of the eddy current sensor 10, which has already been known, with the tuning circuit 40 is proper.

When the sensor and tuning circuit inspection section 24 compares a change in an output of the voltage measuring device 51 at the time of changing the inductance value of the variable induction element 22 connected to the tuning circuit 40 according to the known inductance characteristic with a change in an output of the voltage measuring device 51 detected while a gap with a metallic object is being changed under the condition that the actual eddy current sensor 10 is connected to the tuning circuit 40, it becomes possible to evaluate the actual inductance characteristic of the eddy current sensor 10.

In this connection, in this embodiment, the sensor and tuning circuit inspection section 24 and the impedance adjustment section 50 are described as being separated, from each other, into different blocks. However, the sensor and tuning circuit inspection section 24 and the impedance adjustment section 50 may be made into one block of an MCU.

Referring to FIG. 3 again, a signal level detected by the detection circuit 70 is affected by a rise in the temperature of the eddy current sensor 10 and the amplifying unit 20 and by a change in the impedance constant of the analog element, which is provided in the sensor head of the eddy current sensor 10 and the amplifying unit 20, caused when the sensor head of the eddy current sensor 10 and the amplifying unit 20 are energized with an electric current. Problems may be caused by this influence when the sensor head and the amplifying unit are adjusted. In order to prevent the occurrence of the problems, it is preferable that the eddy-current sensor 10 and the amplifying unit 20 are energized with electric current only when an abnormality of a state, in which the tool holder 3 is attached, is judged and that the eddy-current sensor 10 and the amplifying unit 20 are not energized with electric current at other times, so that a rise in the temperature of the eddy current sensor 10 and the amplifying unit 20 can be prevented.

Therefore, the machine tool 1 includes a measurement command signal generation section 6 for generating a measurement command signal to give a command of measuring a distance between the eddy current sensor 10 and the flange outer circumferential face 3b of the tool holder 3. After a worker has completed a work of replacing the eddy current sensor 10, this measurement command signal generation section 6 automatically generates a measurement command signal.

The thus generated measurement command signal is inputted into the micro-computer 8 via the interface circuit (I/O). Only when this measurement command signal is received, by the micro-computer 8, does the micro-computer 8 energize the eddy current sensor 10 and the amplifying unit 20 with electric current. At other times, the eddy current sensor 10 and the amplifying unit 20 are not energized with electric current.

In this connection, instead of the operation of the micro-computer 8 in which the entire amplifying unit 20 is not energized with electric current while the measurement command signal is not being received, only supply of the AC signal by the oscillating circuit 60 may be stopped. Due to the foregoing, the supply of the AC signal to the tuning circuit 40 and the eddy current sensor 10 is stopped, and a rise in the temperature of the tuning circuit 40 and the eddy current sensor 10 can be prevented. In the case of the DDS described above, it is possible to instantaneously stop and start an output of the AC signal. Therefore, it is preferable to use a DDS for the oscillating circuit 60.

While the measurement command signal is not being received, that is, while the measurement is not being conducted and, for example, while the machine tool 1 is conducting a machining work, an electric current flowing in the eddy current sensor 10, that is, an output of the oscillating circuit 60 may be reduced as compared with the measurement time so as to prevent a rise in the temperature of the eddy current sensor 10 and the tuning circuit 40. The detection signal generated by the eddy current sensor 10 at the time of no measurement is used only as a monitor for detecting whether or not the tool holder 3 is attached. Therefore, it is sufficient that drive is conducted by a low intensity electric current, the resolution of which is low.

Figure 13:
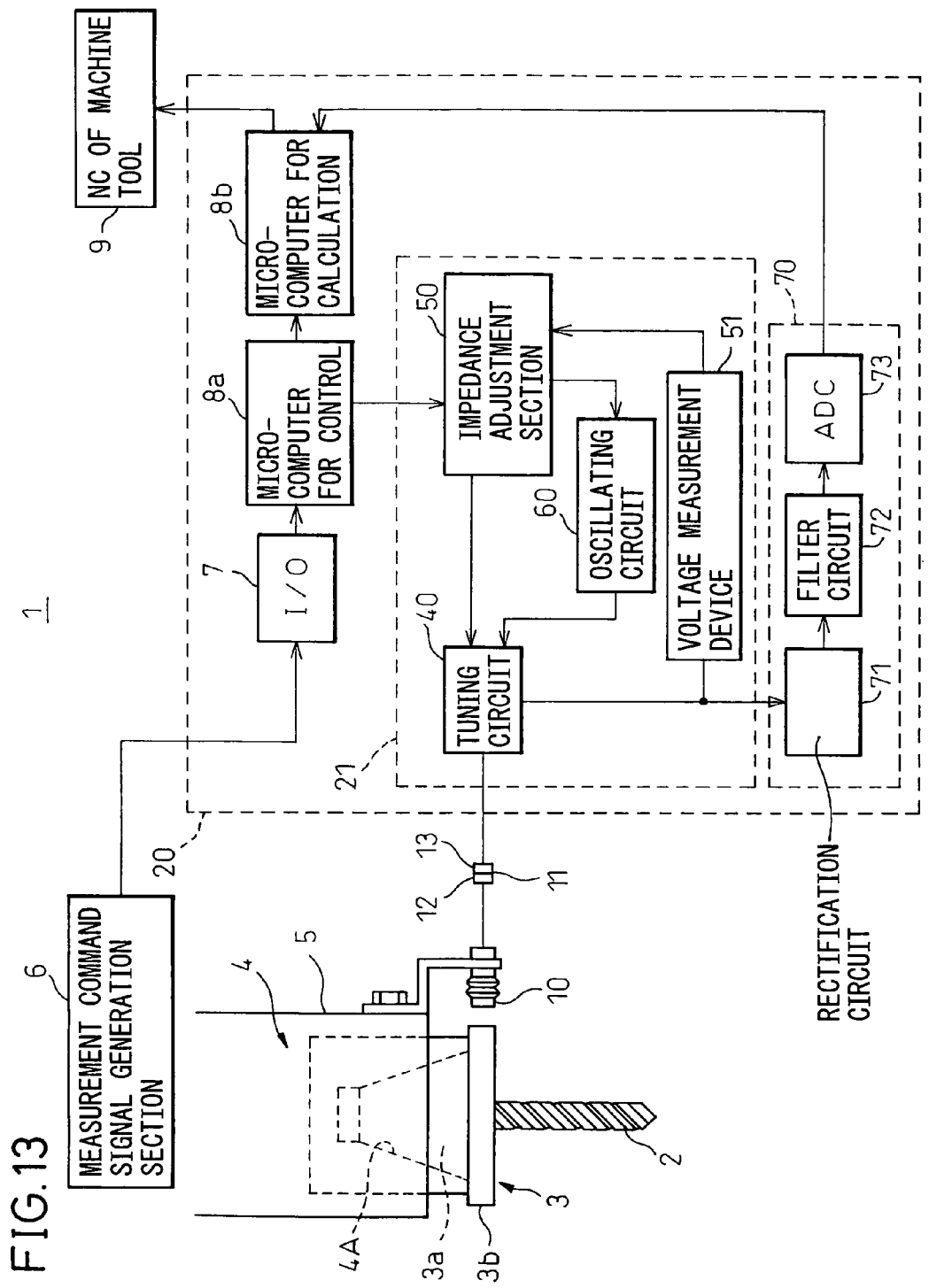
FIG. 13 is an arrangement view showing an outline of a second embodiment of a machine tool of the present invention.

The micro-computer 8 shown in FIG. 3 may be a low electric current consumption type micro-computer 8a used for control which controls a circuit such as an eddy current sensor 10 or a sensor drive circuit 21 in the second embodiment shown in FIG. 13 and a micro-computer 8b used for calculation which judges an abnormality of a state in which the tool holder 3 is attached to the main spindle according to the measurement data collected by the micro-computer 8a used for control.

The micro-computer 8b for calculation may be started only when a measurement command signal is generated by the measurement command signal generation section 6. In this way, electric power consumed by the micro-computer 8b and used for calculation can be saved.

Figure 14:
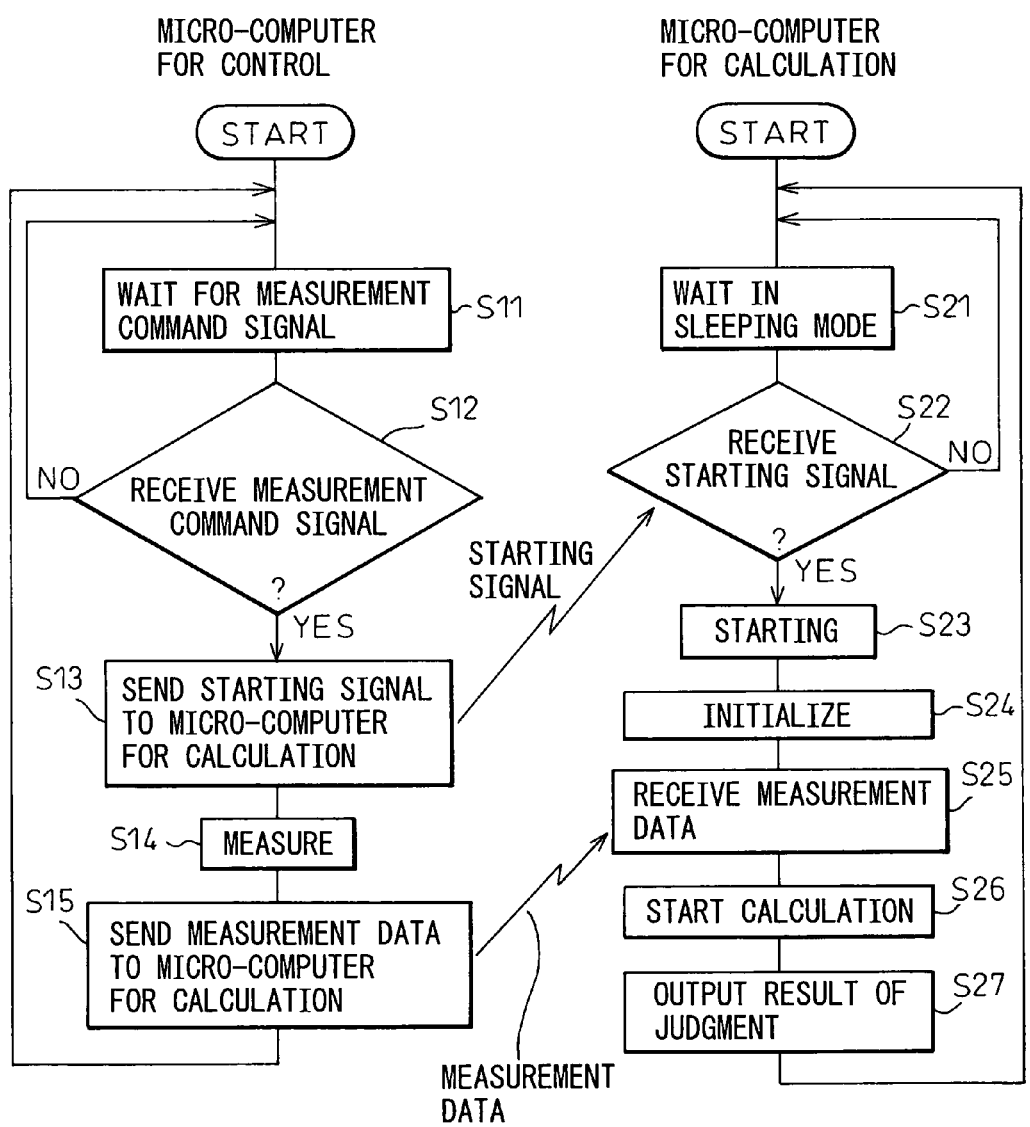
FIG. 14 is a flow chart for explaining a function of automatically turning on and off an electric power source of a machine tool shown in FIG. 3.

FIG. 14 is a flow chart for explaining a function of automatically turning on and off an electric power source of the micro-computer 8b used for calculation in a machine tool shown in FIG. 3.

In the loop of steps S11 and S12, the micro-computer 8a used for control waits for a reception of the measurement command signal sent from the measurement command signal generation section 6. On the other hand, in the loop of steps S21 and S22, the micro-computer 8b used for calculation waits for a starting signal, which is sent from the micro-computer 8a used for control, in a sleep mode.

When the micro-computer 8a used for control receives a measurement command signal from the measurement command signal generation section 6, the program proceeds to step S13. After the micro-computer 8a used for control has sent a starting signal to the micro-computer 8b used for calculation, the program proceeds to step S14, and the amplifying unit 20 and the sensor drive circuit 21, which are provided inside the amplifying unit 20, are energized with electric current. Therefore, a detection signal sent from the eddy current sensor 10 is measured via the detection circuit 70.

On the other hand, when the micro-computer 8b used for calculation receives a starting signal from the micro-computer 8a used for control, it is started in step S23. Initializing is conducted in step S24. After that, the micro-computer 8b used for control waits for the next operation until the micro-computer 8a for control completes a measurement of the detection signal sent from the eddy current sensor 10.

After the measurement has been completed, the micro-computer 8a used for control sends the measurement data to the micro-computer 8b used for calculation in step S15. Then, the program returns to step S11 for waiting a measurement command signal used for the next measurement.

In step S25, the micro-computer 8b used for calculation receives the measurement data sent from the micro-computer 8a used for control. In step S26, the micro-computer 8b used for calculation executes calculation for judging an abnormality of the state in which the tool holder 3 is attached. In step S27, a result of the judgment is outputted onto a display unit, a printer or a network.

Next, the program returns to step S21 and the micro-computer 8b for calculation waits for a reception of the next starting command in the sleeping mode. In this connection, the micro-computer 8b for calculation may not wait for the next operation in the sleeping mode but may be completely shut down.

As described above, according to the machine tool 1 of the present invention, in the case where the displacement sensor such as an eddy current sensor 10 is damaged, the damaged sensor can be easily replaced at a work site. However, in order to prevent the displacement sensor 10 from being damaged and to reduce the replacing work itself, it is preferable that a protective block for reducing a shock given to the displacement sensor 10 at the time of collision with a foreign object is attached to a forward end portion of the displacement sensor 10.

Figure 15A:
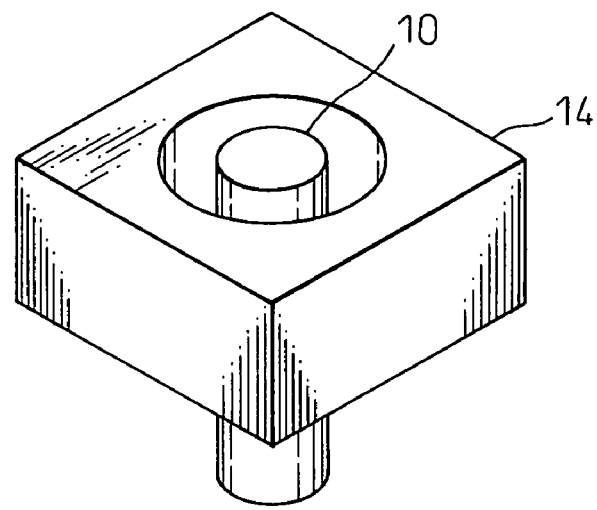
FIGS. 15A to 15c are schematic illustrations of a protective block of an eddy current sensor.
Figure 15B:
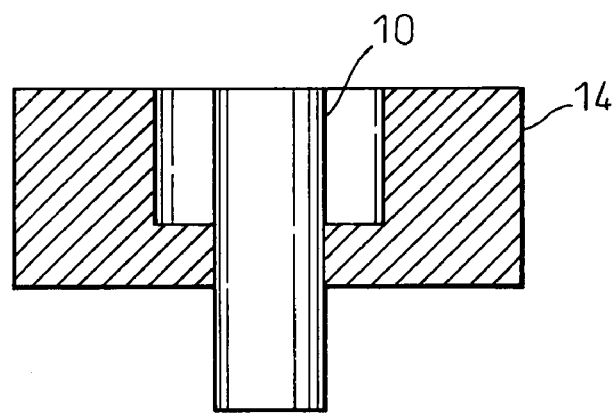
Figure 15C:
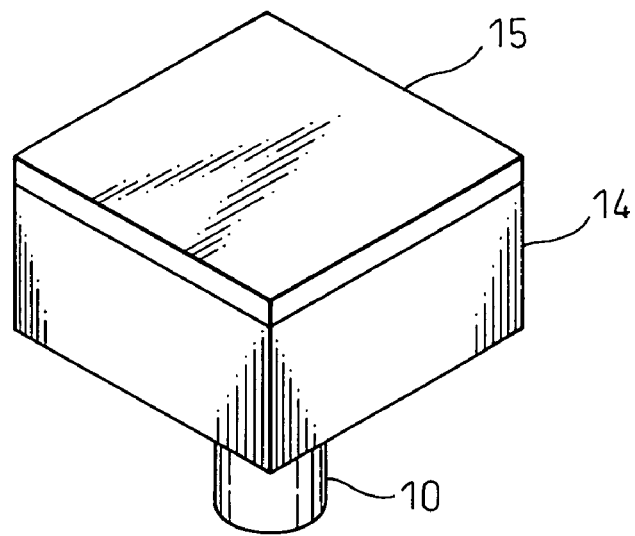

FIG. 15A is a perspective view showing a first example of the protective block for protecting a forward end portion of the displacement sensor 10. FIG. 15B is a sectional side view showing a protective block for protecting a forward end portion of the displacement sensor 10. FIG. 15C is a perspective view showing a second example of the protective block for protecting a forward end portion of the displacement sensor 10.

As shown in FIGS. 15A and 15B, the protective block 14 includes a hollow columnar block. When a forward end portion of the displacement sensor 10 is accommodated in the hollow portion of the protective block 14, it is possible to reduce a shock of collision given to the displacement sensor 10 when a foreign object collides with the forward end portion of the displacement sensor 10.

In the case where the above eddy current sensor is used for the displacement sensor 10, as an impedance value of the eddy current sensor is changed according to a distance from the eddy current sensor to a metallic object, it is necessary that the protective block 14 is made of nonmetallic material such as resin material or an engineering plastic such as polyether-ethal-ketone (PEEK).

In some cases, the forward end portion of the displacement sensor 10 is damaged by chips coming from a workpiece when it is being machined by the tool 2. Accordingly, as shown in FIG. 15C, it is preferable that the forward end portion of the protective block 14 is attached with a cover 15 so as to enhance the effect of protection. In the case where the eddy current sensor is used, this cover 15 is also made of nonmetallic material.

A cover member 15 of the eddy current sensor 10 itself may be made of an engineering plastic such as PEEK.

In this connection, a coil for generating an eddy current on the metallic surface of an object to be measured is incorporated into the above eddy current sensor 10. In the conventional eddy current sensor 10, this coil is manufactured in such a manner that an electric wire is wound round a bobbin. Therefore, the characteristic of the eddy current sensor fluctuates due to a failure or fluctuation of winding the electric wire. Accordingly, the eddy current sensor 10 used for the machine tool 1 of the present invention may be realized by using a wiring board on which a pattern is provided so that the same impedance response as that of the coil can be obtained.

Examples of the wiring board on which the above pattern is formed may be a glass board and a flexible board.

Alternatively, the following constitution may be adopted. The eddy current sensor 10 is attached to the machine tool 1 so that it can be moved by a drive means such as an actuator and a distance from the eddy current sensor 10 to the tool flange 3*b* can be changed. While the distance from the eddy current sensor 10 to the tool flange 3*b* is being changed, a detection signal is obtained from the eddy current sensor 10. When a result of the obtained detection signal is analyzed, whether or not the eddy current sensor 10 or the amplifying unit 20 is good is judged by the micro-computer 8.

In the arrangement shown in FIG. 3, the eddy current sensor 10 and the amplifying unit 20 are connected with each other by the connector 11. When the unit of the eddy current sensor 10 itself is made to have an oscillating circuit and a wireless communication function, the eddy current sensor 10 and the amplifying unit 20 may be connected with each other by wireless. Further, a signal may be sent and received between the measurement command signal generation section 6 and the micro-computer 8 by wireless.

The amplifying unit 20 may be provided with a wireless communication function so as to communicate with a computer unit such as a personal computer not shown in the drawing. The amplifying unit 20 may be connected to a wireless LAN environment, and an automatic information sending function may be added to this apparatus, by which information can be automatically sent to a terminal of a person in charge when trouble has occurred.

By using a personal computer (not shown) connected to the amplifying unit 20 by the wireless LAN environment, the record of the measurement data obtained recently may be always collected, stored and renewed. In the case of the occurrence of trouble, when this record is analyzed, the cause of trouble can be specified.

Further, the eddy current sensor 10 and the amplifying unit 20 respectively may have bar codes (two-dimensional bar codes), and a combination of the eddy current sensor 10 and the amplifying unit 20 may be controlled by the bar codes.

A plurality of eddy current sensors 10 may be provided in the head 5 to which the main spindle 4 is attached. For example, a plurality of eddy current sensors 10 are arranged in parallel with each other. When the plurality of eddy current sensors 10 are arranged as described above and a difference of detected values between the plurality of eddy current sensors 10 is found, it becomes possible to detect a posture of a workpiece when the workpiece is obliquely attached. Alternatively, it becomes possible to measure a shape of the workpiece. In the case where the plurality of eddy current sensors 10 are arranged as described above, a communication function may be provided, by which communication can be conducted between the plurality of eddy current sensors 10.

Temperature sensors may be provided in the eddy current sensor 10 and the amplifying unit 20 so as to cancel a change in the measured value caused when a temperature of the analog element is raised. In order to accomplish this object, the following constitution may be adopted. Each detection value of the temperature sensor and each correction value corresponding to the detection value are previously found by an experiment or from a theoretical value and stored in the micro-computer 8. At the time of measurement, a detection value of the temperature sensor is read out. According to the thus read detection value, the detection value obtained from the eddy current sensor 10 may be corrected.

The micro-computer 8 may be provided with a voice discriminating function, and various motions of the machine tool 1 such as an adjustment of the amplifying unit, measurement and registration of the tool 2 may be automatically started when a command is given by a voice of a worker. The micro-computer 8 may be provided with a voice output function. When a gap is adjusted at the time of attaching the eddy current sensor 10, a worker may be informed of the present gap by a voice so that the attaching work can be made easy.

Referring to the preferred embodiments, the present invention is explained above in detail. In order to facilitate the understanding of the present invention, the specific embodiments of the present invention will be additionally described as follows.

Addition 1

A machine tool (1) in which a tool holder (3) having a tool (2) is attached to a main spindle (4) and the main spindle (4) is rotated to conduct machining on a workpiece, comprising: a displacement sensor (10), the impedance of which is changed according to a distance from the displacement sensor (10) to an outer circumferential face (3*b*) of a flange of the tool holder (3) attached to the main spindle (4); and an oscillating circuit (60, 61) for supplying an AC signal to the displacement sensor (10), wherein an abnormality of a state, in which the tool holder (3) is attached to the main spindle (4), is judged from a signal level appearing in the displacement sensor (10) upon which the AC signal is impressed, the machine tool (1) further comprising:

a tuning circuit (40), which is connected to the displacement sensor (10), for forming a resonance circuit together with the displacement sensor (10), the internal impedance constant of the tuning circuit (40) being changed by a digital signal; and an impedance adjustment circuit (50) for adjusting the internal impedance constant when the digital signal is outputted into the tuning circuit (40).

Addition 2

A machine tool described in Addition 1, wherein the impedance adjustment circuit (50) makes a circuit, which includes the displacement sensor (10) and the tuning circuit (40), into a resonance circuit by adjusting an internal impedance constant of the tuning circuit (40).

Addition 3

A machine tool described in Addition 1, wherein the impedance adjustment circuit (50) adjusts an internal impedance constant of the tuning circuit (40) while a signal level appearing in the displacement sensor (10) is being detected so that the a signal level appearing in the displacement sensor (10) can be not less than a predetermined level and a change in the signal level with respect to the change in the internal impedance constant can be not more than a predetermined value.

Addition 4

A machine tool described in one of Additions 1 to 3, the tuning circuit (40) including: a plurality of impedance elements (C11, C12, C13, C1n, L11, L12, L13, L14); and a switch (ASW) that selects one or a plurality of impedance elements and can connect the thus selected impedance elements with the displacement sensor (10).

Addition 5

A machine tool described in Addition 4, wherein the impedance element is a capacity element (C11, C12, C13, C1n).

Addition 6

A machine tool described in one of Additions 1 to 3, the tuning circuit (40) including a variable capacity element (C1, C2).

Addition 7

A machine tool described in one of Additions 1 to3, the tuning circuit (40) including: a capacity circuit (A, R1, R2, C, Tr) in which an integral circuit is used; and a variable resistance element (Rv, Q) capable of changing a capacity of the capacity circuit.

Addition 8

A machine tool described in one of Additions 1 to 3, the tuning circuit (40) including a capacity element (C) and a variable induction element (Lv).

Addition 9

A machine tool described in Addition 8, the variable induction element (Lv) including: a plurality of induction elements (L11, L12, L13, L14); and a switch (ASW) that selects one or a plurality of inductance elements and can connect the thus selected inductance elements with the displacement sensor (10).

Addition 10

A machine tool described in Addition 8, the variable induction element (Lv) including: a capacity circuit (A, R1, R2, C) in which an integral circuit is used; and a variable resistance element (Rv) capable of changing an inductance of the inductive circuit.

Addition 11

A machine tool described in Addition 7 or 10, the variable resistance element (Rv) including a discrete device (Q).

Addition 12

A machine tool described in Addition 7, 10 or 11 in which the oscillating circuit is a first oscillating circuit (61) and the AC signal supplied from the first oscillating circuit (61) is a first AC signal and the tuning circuit (40) is connected between the displacement sensor (10) and the first oscillating sensor (61), the machine tool (1) further comprising:

a second oscillating circuit (62) for supplying a second AC signal, the frequency of which is different from that of the first AC signal;

a superimposition circuit (63), which is connected between the first oscillating circuit (61) and the tuning circuit (40), for superimposing the first and the second AC signal on each other and supplying the thus superimposed signal to the tuning circuit (40);

a monitor signal extracting circuit (54) for extracting the second AC signal as a monitor signal from the superimposition signal which passes through the tuning circuit (40); and a feedback circuit (54, 55, 56) for increasing and decreasing a resistance value of the variable resistance element (Rv) according to a signal level of the monitor signal.

Addition 13

A machine tool described in Addition 7, 10 or 11 in which the AC signal supplied from the first oscillating circuit (61) is a first AC signal, the tuning circuit (40) is connected between the displacement sensor (10) and the first oscillating sensor (61), and the oscillating circuit (61) supplies the second AC signal, the frequency of which is different from that of the first AC signal, to the tuning circuit (40) while the second AC signal is being superimposed on the first AC signal, the machine tool (1) further comprising:

a monitor signal extracting circuit (54) for extracting the second AC signal as a monitor signal from the superimposition signal which passes through the tuning circuit (40); and a feedback circuit (54, 55, 56) for increasing and decreasing a resistance value of the variable resistance element (Rv) according to a signal level of the monitor signal.

Addition 14

A machine tool described in one of Additions 1 to 13, wherein the impedance adjustment circuit (50) adjusts the impedance of a circuit including the displacement sensor (10) and the tuning circuit (40) by changing an oscillating frequency of the oscillating circuit (60, 61).

Addition 15

A machine tool (1) in which a tool holder (3) having a tool (2) is attached to a main spindle (4) and the main spindle (4) is rotated to conduct machining on a workpiece, comprising: a displacement sensor (10), the impedance of which is changed according to a distance from the displacement sensor (10) to an outer circumferential face (3b) of a flange of the tool holder (3) attached to the main spindle (4); and an oscillating circuit (60, 61) for supplying an AC signal to the displacement sensor (10), wherein an abnormality of a state, in which the tool holder (3) is attached to the main spindle (4), is judged from a signal level appearing in the displacement sensor (10) upon which the AC signal is impressed, the machine tool (1) further comprising:

a tuning circuit (40), which is connected to the displacement sensor (10), for forming a resonance circuit together with the displacement sensor (10); and an impedance adjustment circuit (50) for adjusting impedance of a circuit including the displacement sensor (10) and the tuning circuit (40) by adjusting an oscillating frequency of the oscillating circuit (60, 61).

Addition 16

A machine tool described in Addition 15, wherein the impedance adjustment circuit (50) adjusts an oscillating frequency of the oscillating circuit (60, 61) so that a circuit including the displacement sensor (10) and the tuning circuit (40) can be made into a resonant circuit.

Addition 17

A machine tool described in one of Additions 1 to 16, wherein the displacement sensor (10) and the tuning circuit (40) are connected to each other by a detachable connector (11, 12, 13).

Addition 18

A machine tool (1) in which a tool holder (3) having a tool (2) is attached to a main spindle (4) and the main spindle (4) is rotated to conduct machining on a workpiece, comprising: a displacement sensor (10), the impedance of which is changed according to a distance from the displacement sensor (10) to an outer circumferential face (3b) of a flange of the tool holder (3) attached to the main spindle (4); and an oscillating circuit (60, 61) for supplying an AC signal to the displacement sensor (10), wherein an abnormality of a state, in which the tool holder (3) is attached to the main spindle (4), is judged from a signal level of the AC current appearing in the displacement sensor (10), the machine tool (1) further comprising:

a tuning circuit (40), which is connected to the displacement sensor (10), for forming a resonance circuit together with the displacement sensor (10), wherein the displacement sensor (10) and the tuning circuit (40) are connected to each other by a detachable connector (11, 12, 13).

Addition 19

A machine tool according to one of Additions 1 to 18, further comprising:

a measurement command signal generation means (6) for generating a measurement command signal to command to measure a distance between the displacement sensor (10) and the outer circumferential face (3b) of the flange of the tool holder (3); and a signal stop means (8, 8a) for stopping the supply of the AC signal to the displacement sensor (10) until the measurement command signal is received from the measurement command signal generation means (6).

Addition 20

A machine tool according to one of Additions 1 to 19, wherein the displacement sensor (10) is an eddy current sensor, the machine tool further comprising: a variable induction element (22); and a switching device (23) for switching between the variable induction element (22) and the eddy current sensor (10).

Addition 21

A machine tool (1) in which a tool holder (3) having a tool (2) is attached to a main spindle (4) and the main spindle (4) is rotated to conduct machining on a workpiece, comprising: an eddy current sensor (10), the inductance of which is changed according to a distance from the eddy current sensor (10) to an outer circumferential face (3b) of a flange of the tool holder (3) attached to the main spindle (4); and an oscillating circuit (60, 61) for supplying an AC signal to the eddy current sensor (10), wherein an abnormality of a state, in which the tool holder (3) is attached to the main spindle (4), is judged from a signal level appearing in the eddy current sensor (10) upon which the AC signal is impressed, the machine tool (1) further comprising:

a variable induction element (22); and a switching device (23) for switching between the variable induction element (22) and the eddy current sensor (10).

In the present invention, when the machine tool is composed so that the internal impedance constant of the tuning circuit in the amplifying unit can be changed from the outside, it becomes possible to change the internal impedance constant of the tuning circuit by a digital signal processing means such as a computer or a micro-computer. Due to the foregoing, tuning of the amplifying unit can be automatically conducted according to an adjustment algorithm capable of being executed by a digital signal processing means. Accordingly, the displacement sensor only can be replaced, at a work site, without replacing the amplifying unit.

When impedance of the circuit including the displacement sensor and the tuning circuit is adjusted by adjusting the oscillating frequency of the oscillating circuit, tuning of the amplifying unit can be automatically conducted. In this connection, the tuning circuit may be composed in such a manner that an impedance constant of the tuning circuit is switched not only by a digital signal but also by an analog signal.

When the tuning circuit and the displacement sensor are connected to each other by the detachable connector, the displacement sensor only can be replaced at a work site.

When switching is made between the variable induction circuit and the eddy current sensor, the inductance of the variable induction circuit is changed and it becomes possible to simulate the eddy current sensor. Accordingly, if a range of the characteristic of the displacement sensor, which can be used in view of the specification of the machine tool, is already known, it is possible to evaluate the appropriateness of a combination of the displacement sensor with the amplifying unit by using the variable induction circuit.

The present invention can be preferably applied to a machine tool having a rotary shaft. Especially, the present invention can be preferably applied to a machine tool in which a tool holder such as a machining center is used.

While the invention has been described with reference to specific embodiments chosen for purpose of illustration, it should be apparent that numerous modifications could be made thereto, by those skilled in the art, without departing from the basic concept and scope of the invention.

What is claimed is:

1. A machine tool comprising:
a tool holder;
a main spindle attached to the tool holder to conduct machining on a workpiece; and
a displacement detection means including a sensor head for detecting a distance between the sensor head and the tool holder and including an amplifying unit for generating distance information according to a signal inputted from the sensor head, wherein
said amplifying unit comprises a tuning circuit for forming a resonance circuit with said sensor head and an impedance adjustment circuit, and wherein
the impedance adjustment circuit being adapted to adjust the internal impedance constant of said tuning circuit utilizing resonance of said resonance circuit by changing capacitance value of said tuning circuit.

2. A machine tool according to claim 1, wherein impedance of the sensor head changes according to a distance between the sensor head and the tool holder.

3. A machine tool according to claim 2, wherein inductance of the sensor head changes according to a distance between the sensor head and the tool holder.

4. A machine tool according to claim 2, wherein the amplifying unit further comprises an oscillating circuit for supplying an AC signal to the sensor head, wherein a displacement of the tool holder is detected according to a change in the impedance of the sensor head.

5. A machine tool according to claim 4, wherein the amplifying unit further comprises a variable impedance circuit as an impedance circuit, wherein the impedance of the variable impedance circuit is automatically adjusted so that the impedance detected by the sensor head and the variable impedance circuit resonate with each other.

6. A machine tool according to claim 1, wherein impedance of the variable impedance circuit is variably controlled by a digital signal.

7. A machine tool according to claim 6, wherein the impedance adjustment circuit adjusts the impedance of the variable impedance circuit by outputting a digital signal into the variable impedance circuit.

8. A machine tool according to claim 1, wherein the impedance adjustment circuit adjusts the impedance of the variable impedance circuit according to the impedance detected by the sensor head when the sensor head is put in a predetermined detection state.

9. A machine tool according to claim 8, wherein the impedance adjustment circuit adjusts the impedance of the variable impedance circuit according to an electric signal detected corresponding to the impedance of the sensor head from the sensor head.

10. A machine tool according to claim 9, wherein the electric signal is a voltage signal.

11. A machine tool according to claim 9, wherein the impedance adjustment circuit adjusts impedance of the variable impedance circuit so that the electric signal can satisfy a predetermined condition.

12. A machine tool according to claim 11, wherein the electric signal is a voltage signal.

13. A machine tool according to claim 5, wherein the amplifying unit adjusts impedance of the variable impedance circuit by changing an internal impedance of the variable impedance circuit.

14. A machine tool according to claim 13, wherein the variable impedance circuit includes at least one capacity element.

15. A machine tool according to claim 5, wherein the variable impedance circuit further comprises a plurality of impedance elements; and a switch for selecting one or more of the plurality of impedance elements.

16. A machine tool according to claim 15, wherein the impedance element is a capacity element.

17. A machine tool according to claim 4, in which the oscillating circuit and the AC signal are respectively a first oscillating circuit and a first AC signal, wherein the amplifying unit further comprises:
- a second oscillating circuit for supplying a second AC signal, the frequency of which is different from that of the first AC signal;
- a superimposition circuit for superimposing the first AC signal and the second AC signal on each other and supplying the superimposed signal to the impedance circuit;
- a monitor signal extracting circuit for extracting the second AC signal as a monitor signal from the superimposition signal which has passed through the impedance circuit; and
- a compensation circuit for compensating an impedance constant of the impedance circuit according to the signal level of the monitor signal.

18. A machine tool according to claim 1, further comprising a connector for detachably connecting the sensor head with the amplifying unit.

19. A machine tool according to claim 4, further comprising:
- a measurement command signal generation means for generating a measurement command signal to command to measure a distance between the displacement sensor head and the outer circumferential face of the flange of the tool holder; and
- a signal stop means for stopping the supply of the AC signal to the displacement sensor head until the measurement command signal is received from the measurement command signal generation means.

20. A machine tool according to claim 15, further comprising:
- a measurement command signal generation means for generating a measurement command signal to command to measure a distance between the displacement sensor head and the outer circumferential face of the flange of the tool holder; and
- a signal stop means for stopping the supply of the AC signal to the displacement sensor head until the measurement command signal is received from the measurement command signal generation means.

* * * * *